US008758127B2

United States Patent
Wang et al.

(10) Patent No.: US 8,758,127 B2
(45) Date of Patent: Jun. 24, 2014

(54) IN-VEHICLE GAMING SYSTEM FOR A DRIVER

(71) Applicant: Audible, Inc., Newark, NJ (US)

(72) Inventors: Douglas Cho Wang, New York, NY (US); Graham James Bavitz, South Orange, NJ (US); Aaron Payne Goldsmid, New York, NY (US); Douglas Scott Goldstein, Riverdale, NJ (US); Pamela R. Spector, New York, NY (US); Guy Ashley Story, Jr., New York, NY (US)

(73) Assignee: Audible, Inc., Newark, NJ (US)

( * ) Notice: Subject to any disclaimer, the term of this patent is extended or adjusted under 35 U.S.C. 154(b) by 0 days.

(21) Appl. No.: 13/752,128

(22) Filed: Jan. 28, 2013

(65) Prior Publication Data

US 2014/0128145 A1    May 8, 2014

Related U.S. Application Data

(60) Provisional application No. 61/724,239, filed on Nov. 8, 2012.

(51) Int. Cl.
*A63F 9/24* (2006.01)
*A63F 13/00* (2014.01)

(52) U.S. Cl.
USPC ............... 463/30; 463/1; 463/31; 463/43

(58) Field of Classification Search
USPC ......... 463/1, 29–31, 40–43; 701/36; 702/182; 340/435, 436, 500, 525, 540
See application file for complete search history.

(56) References Cited

U.S. PATENT DOCUMENTS

| | | | |
|---|---|---|---|
| 6,249,720 B1 * | 6/2001 | Kubota et al. ................ 701/1 |
| 6,266,589 B1 * | 7/2001 | Boies et al. .................. 701/36 |
| 6,401,033 B1 * | 6/2002 | Paulauskas et al. ........... 701/410 |
| 6,700,482 B2 * | 3/2004 | Ververs et al. ............... 340/500 |
| 6,895,238 B2 * | 5/2005 | Newell et al. ............. 455/414.2 |
| 7,835,834 B2 * | 11/2010 | Smith et al. .................. 701/36 |
| 2002/0091473 A1 * | 7/2002 | Gardner et al. ............. 701/35 |
| 2003/0149545 A1 * | 8/2003 | Shu et al. .................... 702/182 |
| 2006/0259206 A1 * | 11/2006 | Smith et al. .................. 701/1 |
| 2007/0149284 A1 * | 6/2007 | Plavetich et al. ........... 463/37 |
| 2007/0213884 A1 * | 9/2007 | Burnham et al. ............ 701/1 |
| 2008/0021640 A1 * | 1/2008 | Pyo ............................. 701/209 |
| 2008/0129684 A1 * | 6/2008 | Adams et al. ............... 345/156 |
| 2008/0208680 A1 * | 8/2008 | Cho ............................ 705/13 |
| 2008/0291032 A1 * | 11/2008 | Prokhorov et al. ......... 340/576 |
| 2008/0311983 A1 * | 12/2008 | Koempel et al. ........... 463/31 |
| 2010/0241021 A1 * | 9/2010 | Morikawa et al. .......... 600/544 |
| 2011/0106375 A1 * | 5/2011 | Gurusamy Sundaram ..... 701/33 |
| 2012/0095643 A1 * | 4/2012 | Bose et al. ................. 701/32.8 |

* cited by examiner

*Primary Examiner* — Milap Shah
(74) *Attorney, Agent, or Firm* — Knobbe, Martens, Olson & Bear, LLP

(57) ABSTRACT

An in-vehicle gaming system may be played by a driver alone, or simultaneously or individually by a driver and/or one or more other users. The in-vehicle gaming system may be activated or controlled by, for example, touch, voice, or gesture. Gameplay is dynamically adjusted based at least in part on environmental factors such that the driver is not distracted from driving the vehicle. Game content is generated based at least in part on environmental factors and user data.

31 Claims, 8 Drawing Sheets

IN-VEHICLE GAMING SYSTEM FOR A DRIVER

CROSS-REFERENCE TO RELATED APPLICATION

This application claims priority under 35 U.S.C. §119(e) to U.S. Provisional Patent Application No. 61/724,239, entitled "IN-VEHICLE GAMING SYSTEM" and filed on Nov. 8, 2012. The disclosure of this provisional application is hereby incorporated by reference in its entirety.

BACKGROUND

In-vehicle entertainment has traditionally been provided by the radio. The driver and, if present, passengers in the vehicle usually select a radio station, and then passively listen to the audio, be it music or talk. Other audio entertainment is also available, including cassette tapes, CDs, audiobooks, portable electronic music players. In each case, the vehicle occupants passively consume the content presented to them aurally.

More recently, in-vehicle entertainment systems provide the opportunity for vehicle passengers to watch video, such as movies or TV programs, on embedded in-vehicle displays. Such an option is not typically available to the driver of the vehicle due to the likelihood of distraction. And again, such entertainment options consist of the vehicle occupants passively consuming the content of the movie or TV program.

More advanced entertainment systems may include gaming consoles or computers. These systems give the vehicle passengers the opportunity to engage in, for example, video games while traveling to a destination. Again, however, such systems are not typically available to the driver of the vehicle because of the concern that such a game system could be distracting to the driver.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Overview of the Present Disclosure

Player-System Interaction

Generally described, aspects of the present disclosure are directed to an in-vehicle gaming system that may be played by a driver or operator alone, or simultaneously or individually by a driver and/or one or more passengers in a vehicle. The in-vehicle gaming system may be activated or controlled by, for example, touch, voice, or gesture. For instance, in one embodiment, the in-vehicle game may be a trivia game displayed on an embedded display, such as an in-vehicle navigation system or other embedded display, and a user may interact with the in-vehicle game by touching the display to select answers to questions. In another embodiment, the in-vehicle game may be voice based/controlled, such that the user interacts with the in-vehicle game by listening and/or speaking. In the trivia game example, questions may be presented to the user or player as text or pictures on the display, or as sounds, such as spoken words, through a vehicle audio system. In an embodiment, the user of the in-vehicle gaming system interacts with the in-vehicle game through a portable computing device not attached to or embedded in the vehicle, such as a mobile phone or smartphone. For purposes of the present disclosure, "user" may be used to refer to a driver or operator of the vehicle, or a passenger of the vehicle, who is participating in the in-vehicle game.

Figure 1:
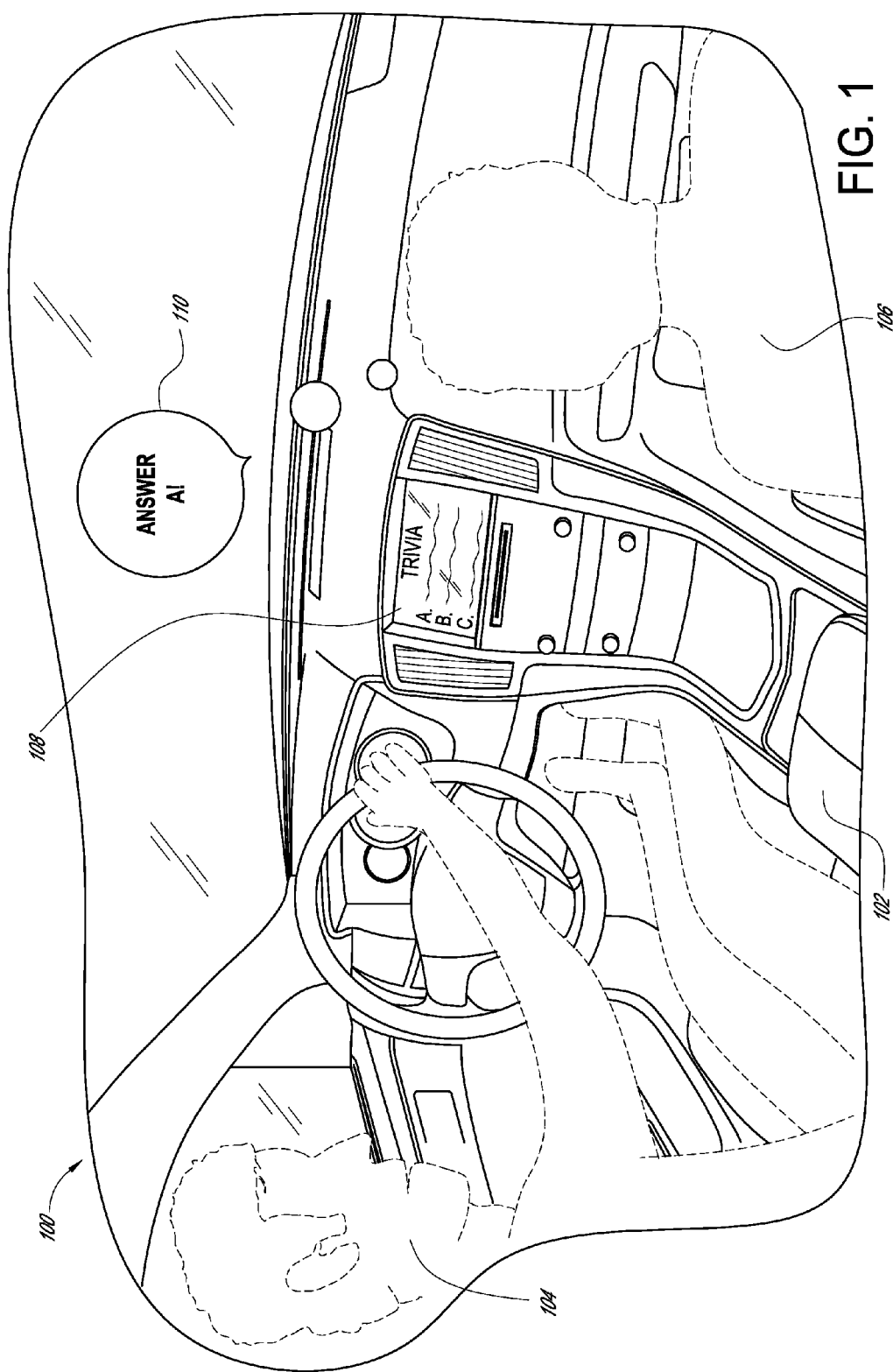
FIG. 1 is an example of users interacting with an in-vehicle gaming system, according to an embodiment of the present disclosure.

FIG. 1 shows an example of users interacting with an in-vehicle gaming system 100 and as will be described in further detail below. In the example, the users include a driver 104 and a passenger 106 who are traveling in a vehicle 102. The in-vehicle gaming system is displaying a trivia question on an in-vehicle display 108. The passenger 106 is answering the question vocally with a spoken answer 110. In the example of users interacting with an in-vehicle gaming system 100, the question may also have been presented through the vehicle audio system in addition to being displayed on the in-vehicle display 108, and either the driver 104 or the passenger 106 may have provided an answer to the trivia question by selecting an answer from the in-vehicle display 108 (e.g., by touching the displaying or using another user input device).

System Communication

As the user interacts with the in-vehicle gaming system, the in-vehicle gaming system may generate game content, for example, trivia questions. In an embodiment, the in-vehicle gaming system is embedded and may communicate via a wireless network with a content server located remotely from the vehicle. In this embodiment, the game content may be stored in a content data store, from which the content server draws the content, and then transmits that content via the wireless network to the in-vehicle gaming system with which the vehicle is equipped. The content may then be presented to the user via the embedded display 108. In another embodiment, game content is generated and stored locally, in, for example, by the in-vehicle gaming system. In another embodiment, the driver and/or passengers interact with the in-vehicle gaming system using their portable computing devices, such as smartphones, which communicate wirelessly (e.g., via short-wavelength radio transmission) with the in-vehicle gaming system. In another embodiment, the driver's and/or passengers' portable devices communicate directly with a remote content or game server rather than or in addition to the embedded, in-vehicle gaming system.

Dynamic Driver Distraction Reduction

In an embodiment, the in-vehicle gaming system may be played by a single user, for example a driver of a car. As the driver plays the in-vehicle game, the gameplay may be dynamically adjusted or modified to account for the distraction of the driver. Accordingly, gameplay may be dynamically modified in order to reduce driver distraction and improve safety. In this regard the in-vehicle gaming system may monitor one or more environmental factors as the driver uses the in-vehicle gaming system to assess driver distraction. These factors may include, for example, the driver's driving behavior, passengers in the vehicle and their locations and actions, the speed, irregular motion and location of the vehicle, the environment surrounding the vehicle, and the weather, among others.

In this embodiment, the driver or operator may begin playing the game in the normal gameplay state, but the gameplay state may be modified to reduce driver distraction. Modifications to the gameplay state may include changing the focus of the game, changing the game difficulty, and reducing the volume of the game, among other things. For instance, in the trivia game example, as a user answers questions, the content of each subsequent question may be made easier or more difficult. The in-vehicle gaming system may also completely interrupt gameplay, or end the game, in response to the mentioned environmental factors to reduce driver distraction.

User Identification

In an embodiment, the in-vehicle gaming system may identify a user based on characteristics associated with the user. For example, one or more users in the vehicle may be identified by his or her position in the vehicle, by the way his or her seat is adjusted, by his or her height, by his or her weight, through facial recognition or voice recognition, or through communication with the user's mobile phone, key or smartphone, among other things.

Content Customization

Additionally, in an embodiment, the content of the in-vehicle game may be dynamically generated or adjusted by the in-vehicle gaming system based on the identity of the users in the vehicle. Once a user is identified by the in-vehicle gaming system, the characteristics of that user may form the basis for the content of the in-vehicle game. Such characteristics may include, for example, the user's age or education, the user's interests, or the content that the player owns, such as books, audiobooks, movies, or music, among other things. Thus, in the trivia game example, the trivia questions may be drawn from information or themes of the content the user owns or has accessed. In another example, the difficulty level of the content may be adjusted based on the user's characteristics. If, for example, the user answers a number of difficult questions wrong, the questions may be adjusted to be of a type that are generally easier to answer.

An Embodiment of the Present Disclosure as Used by Multiple People in the Same Vehicle In an embodiment, the in-vehicle gaming system may be played by multiple people in the same vehicle simultaneously. As described above, users of the in-vehicle gaming system may interact with the system through touch, voice, or gesture, among other things. The gameplay may be presented to the users in a single display, such as a vehicle embedded display, or each user may have their own display, such as the display associated with an in-vehicle entertainment system, or a smartphone. Alternatively, users may interact with the system through audio, either combined through the vehicle audio system, or individually through, for example, individual headphones and microphones. The in-vehicle gaming system may distinguish between users to receive voice commands or answers from specific users, among other things.

As described above with respect to a single player, the gameplay may be dynamically adjusted or modified to account for the distraction of the driver. In one example, the driver's participation in the gameplay may be limited if the in-vehicle gaming system determines that the driver is distracted. For example, if the driver is in control of the gameplay as the designated answerer of the trivia questions being presented to the users, the control of the gameplay may be transferred to another user other than the driver.

In an embodiment, the content of the in-vehicle game may be dynamically generated or adjusted by the in-vehicle gaming system based on the identities of the group of users in the vehicle. The characteristics of the users, as described above, may be used as the basis of the game content themes or questions, among other things. In one example, the in-vehicle gaming system determines what content is similar among the group of users. For example, if all of the users have bought a particular movie (as identified by analyzing each user's purchase history), the content of the in-vehicle game may be drawn directly from the movie. Thus, in the trivia game example, the trivia questions would be about the movie or the characters in the movie, and would thereby apply to the whole group. In another example, if all the users have a common interest, for example, they have all bought sports-related books, the content of the in-vehicle game may relate to that common interest, here, sports. Thus, in the trivia games example, the trivia questions would have a sports theme, and would be sports-related, and would thereby apply to the whole group. In other examples, the in-vehicle game may determine the appropriate content based upon age, education, language, location, interest and other criteria associated with the group of users.

An Embodiment of the Present Disclosure as Used by Multiple People in Multiple Vehicles In an embodiment, the in-vehicle gaming system may be used by multiple people in different vehicles simultaneously. Each vehicle may have one or more users/players that are interacting with the in-vehicle gaming system. In this embodiment, game content for each of the individual vehicles may be provided by separate in-vehicle devices, or by a central content server. Communications between vehicles, or individual user devices, may be facilitated by communication links/networks, such as smartphones, that may be connected directly from vehicle to vehicle, or through the central content or game server. Communications among vehicles may include audio and/or video, among other things. In this way, users in multiple vehicles may simultaneously participate in the same game.

The in-vehicle gaming system may, in various embodiments, include games of different types, such as, for example, trivia games, puzzles, and games involving multiple vehicles, among others.

DESCRIPTION OF THE FIGURES

To facilitate a complete understanding of the present disclosure, the remainder of the detailed description describes the present disclosure with reference to the remaining drawings, wherein like reference numbers are referenced with like numerals throughout.

Figure 2:
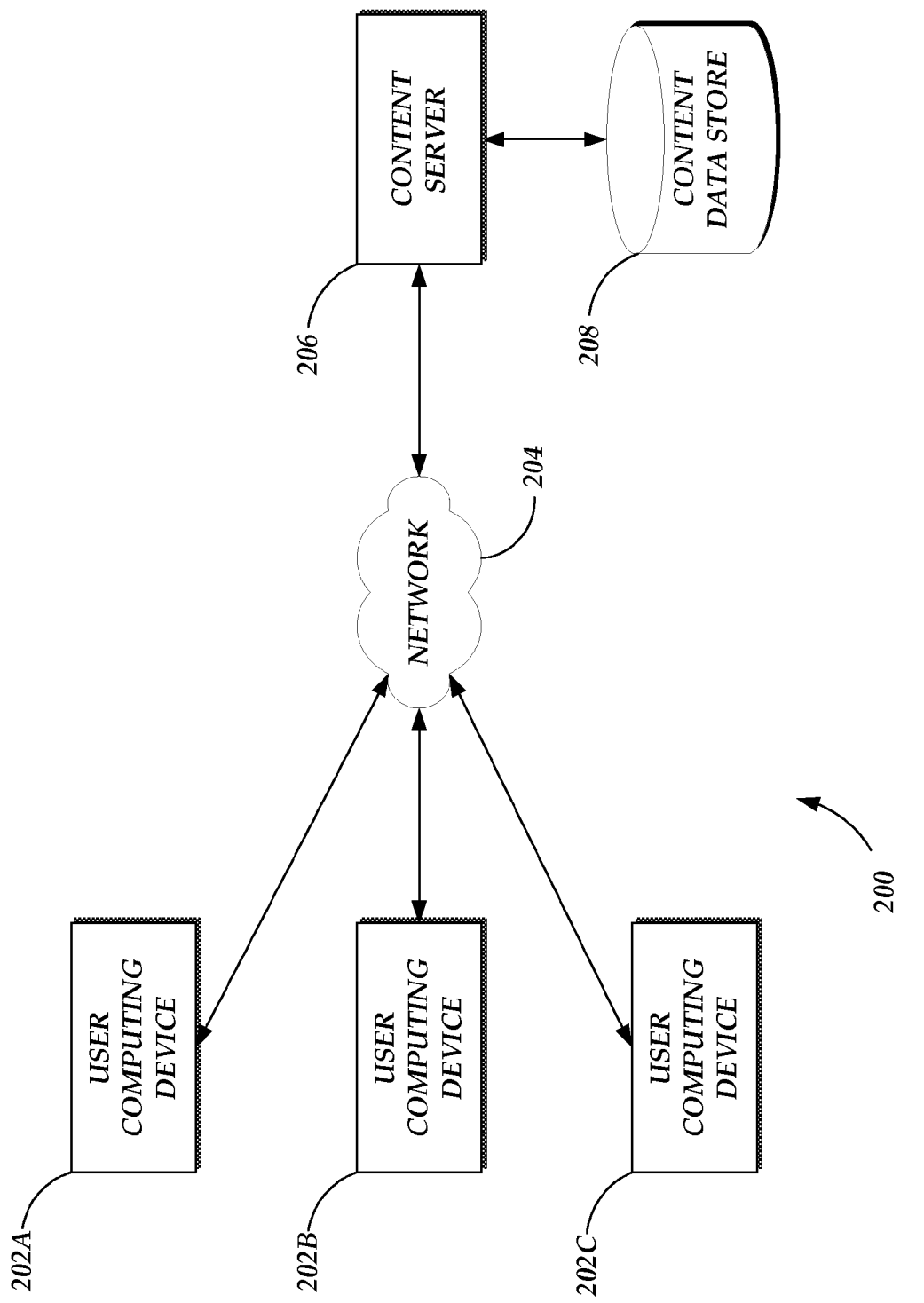
FIG. 2 is a schematic diagram of an illustrative network environment in which an in-vehicle gaming system may operate.

Turning now to FIG. 2, an illustrative network environment 200 in which the in-vehicle gaming system may operate is shown. The network environment 200 may include one or more user computing devices 202 (such as user computing devices 202A-202C), a network 204, a content server 206, and a content data store 208. The constituents of the network environment 200 may be in communication with each other either locally or over the network 204. For example, as illustrated in FIG. 2, the user computing devices 202A-202C are in communication with the network 204, the network 204 is in communication with the content server 206, and the content server 206 is in communication with the content data store 208.

A user computing device 202 may be any computing device capable of communicating over the network 204, such as a laptop or tablet computer, personal computer, personal digital assistant (PDA), hybrid PDA/mobile phone, mobile phone, in-vehicle computer device or navigation system, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 202 may communicate over the network 204, for example, to obtain content from the content server 206, or to transmit user information or answers to the content server 206. In some instances, the user computing devices 202A-202C may communicate with each other over the network 204 as well, e.g., user computing device 202A may be able to communicate with user computing device 202B. Alternatively, the user computing devices 202A-202C may be able to communicate with each other directly.

The user computing device 202 may generally be capable of conveying content to a user of the user computing device 202, and receiving input from the user. For example, the user computing device 202 may be capable of playing audio content by directing audible output through speakers, headphones, or the like. The user computing device 202 may also be capable of displaying images or video content on a display screen. The user computing device 202 may further be capable of conveying questions about an item of content; receiving selections by the user; providing tasks for the user to perform in order to select an answer or content; receiving audio or gesture input; and performing other functions to implement the in-vehicle gaming system.

In some embodiments, the user computing device 202 also stores one or more items of content in an electronic data store. For example, the user computing device 202 may include one or more hard disk drives, solid state memories, and/or any other type of non-transitory computer-readable storage medium accessible to or integrated within the user computing device 202. These items may be retrieved from storage and conveyed by the user computing device 202. These items of content may include one or more questions as described above.

The network 204 may be any wired network, wireless network, or combination thereof. In addition, the network 204 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The content server 206 may be a computing device that performs a variety of operations to implement the in-vehicle gaming system. For example, the content server 206 may provide in-vehicle game content to the user computing device 202; receive user identifying information from the user computing device 202; analyze environmental conditions of the user computing devices 202A-202C; among other operations. Additional operations of the content server 206 are described below with respect to FIG. 3.

The content server 206 may be in communication with the content data store 208. The content data store 208 may electronically store items of content, such as audiobooks, musical works, electronic books, television programs, video clips, movies, multimedia content, video games, and other types of content. The content data store 208 may also maintain information about the items of content that it stores, such as information about the genre of each item of content; an author or director of each item of content; the subject of each item of content; and other information about the content, such as information about characters, settings, and moods of portions of each item of content. The content data store 208 may further store user data that associates a potential user of the in-vehicle gaming system with the items of content that it stores. The content data store 208 may be embodied in hard disk drives, solid state memories, and/or any other type of non-transitory computer-readable storage medium accessible to the content server 206. The content data store 208 may also be distributed or partitioned across multiple storage devices as is known in the art without departing from the scope of the present disclosure.

The user computing device 202 and the content server 206 may each be embodied in a plurality of components, each executing an instance of the respective content of the user computing device 202 and the content server 206. A server or other computing system implementing the user computing device 202 and the content server 206 may include a network interface, memory, processing unit, and non-transitory computer-readable medium drive, all of which may communicate with each other by way of a communication bus. Moreover, a processing unit may itself be referred to as a computing device. The network interface may provide connectivity over the network 204 and/or other networks or computer systems. The processing unit may communicate to and from memory containing program instructions that the processing unit executes in order to operate the user computing device 202 and content server 206. The memory generally includes RAM, ROM, and/or other persistent and/or auxiliary non-transitory computer-readable storage media.

It will be recognized that many of the devices described above are optional and that embodiments of the network environment 200 may or may not combine devices. Furthermore, devices need not be distinct or discrete. Devices may also be reorganized in the network environment 200. For example, the content server 206 may be represented in a single physical server or, alternatively, may be split into multiple physical servers. The content server 206 and the content data store 208 may be combined. The entire content server 206 and content data store 208 may be represented in a single user computing device 202 as well.

Additionally, it should be noted that in some embodiments, the content server 206 may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In operation, a user interacts with the user computing device 202 to play a game. In an embodiment, the user computing device 202 is an embedded display as depicted with the in-vehicle display 108 in FIG. 1. In another embodiment, the user computing device 202 is a handheld or portable device, such as a mobile phone or smartphone. The user may interact with the user computing device 202 through, for example, touch, voice, or gesture. For example, in one embodiment, the user computing device 202 is an embedded display, such as an in-vehicle navigation system display. In this embodiment, the user or player interacts with the in-vehicle game by touching the display to select answers to questions. In another embodiment, the in-vehicle game may be voice controlled, such that the user interacts with the in-vehicle game by speaking. In this example, the user computing device 202 provides a means for voice input, and output. This may include, for example, questions being presented to the user or player as text or pictures on the display, or as sounds received aurally, such as spoken words, through the vehicle audio system. Alternatively, questions or information may be presented to the user tactilely and/or haptically through, for example, vibrations and/or bumps (such as Braille). Tactile presentation may also include presentations made via controllers and/or other devices or parts of the vehicle (such as a steering wheel) with which the user may interact.

The user computing device 202 communicates with the content server 206 to request game content. The game content request is processed by the content server 206, and necessary content information is requested from the content data store 208. The necessary content information is then transmitted back to the content server 206, and then to the user computing device 202. The user of the in-vehicle game system is then presented with the game content at the user computing device 202, and may respond. Responses from the user are then transmitted back to the content server 206 through the network 204.

The user computing devices 202A-202C of FIG. 2 show that multiple devices may communicate with the content server 206. These communications may happen simultaneously, and may all relate to the same in-vehicle game, or may relate to different in-vehicle games. In one embodiment, multiple users are involved in the same in-vehicle game, and each of the user computing devices 202A-202C are presenting the users with game data or content provided and coordinated by the content server 206. In another embodiment, the user computing devices 202A-202C are presenting to users of different and unrelated in-vehicle games. In this embodiment, there may be multiple different vehicles, each of which has an independent in-vehicle game running, or there may be multiple users in the same vehicle that are each participating in their own independent in-vehicle game.

In an embodiment, the in-vehicle gaming system allows the user to answer a question by speech or voice recognition. This may be accomplished by a voice recognition system implemented in three exemplary ways: As a first alternative, especially for simple games, such as trivia games, the in-vehicle gaming system may recognize a response consisting of only a spoken letter. For example, the possible answers may include 'A,' 'B,' or 'C,' and the voice recognition system of the in-vehicle gaming system may simply have to distinguish between the letters in the voice response. As a second alternative, the in-vehicle gaming system may wait for a particular response consisting of a word or phrase. Thus, if the user responds with the correct word or phrase, the voice recognition system may recognize the response as correct. As a third alternative, the in-vehicle gaming system may recognize any arbitrary response. Thus, the user may respond with any word or phrase and the system may recognize it. Any of the three described voice recognition systems described may be implemented depending on the needs of the particular embodiment of the in-vehicle gaming system. In general, the first alternative is simpler to implement than the second, and the second than the third. The voice recognition capability may be implemented in hardware or software, in the user computing device 202 or the content server 206 or other component of the in-vehicle gaming system using voice recognition methods known in the art.

In another embodiment, the in-vehicle gaming system allows the user to answer a question by typing an answer on the user computing device 202, a vehicle embedded computing device, or on some other input device/element, for example a keyboard, smartphone or touch screen interface, in communication with the in-vehicle gaming system. In one example embodiment, the user may be able to provide an answer by pressing one of a few large colored areas, by gesturing on the interface (for example, a swipe up or down), by pressing on the interface with a certain number of fingers (for example, one finger for 'A,' two fingers for 'B'), or by tapping a certain number of times for specific answers. Alternatively, the user may use the buttons built into the vehicle's dash or steering wheel to respond to questions.

Alternatively, each of the user computing devices 202A-202C may communicate directly with one another through one of the aforementioned communications means. For example, each of the user computing devices 202A-202C may communicate through the data network of a wireless network provider.

Other data not strictly related to the game content may be transmitted among the user computing devices 202A-202C and/or the content server 206, including for example, global position data (for example, GPS data).

Some or all game content may be stored on the user computing device 202 in, for example, electronic memory. In this embodiment, the in-vehicle game system may not require the content server 206 or the content data store 208, but the functionality of these components may be incorporated in the user computing device 202.

Alternatively, the user computing devices 202A-202C may communicate with a vehicle embedded computing device. In this embodiment, communication among the user computing devices 202A-202C and/or the content server 206 are relayed through the vehicle embedded computing device. Such an embodiment is discussed in additional detail below in reference to FIG. 4.

Figure 3:
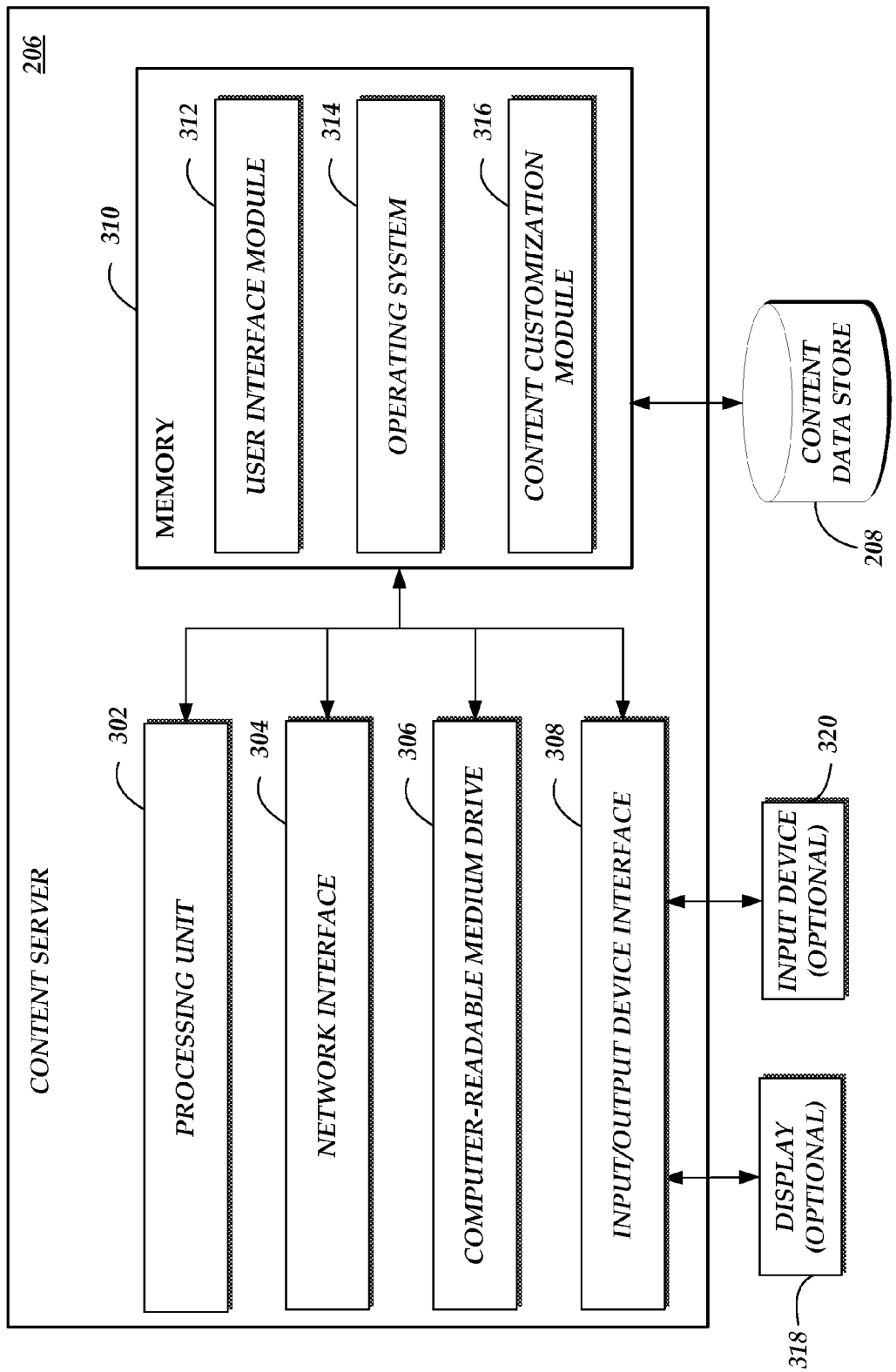
FIG. 3 is a schematic diagram of an illustrative content server.

FIG. 3 is a schematic diagram of the content server 206 shown in FIG. 2. The content server 206 includes an arrangement of computer hardware and software components that may be used to implement in-vehicle gaming system. FIG. 3 depicts a general architecture of the content server 206 illustrated in FIG. 2. Those skilled in the art will appreciate that the content server 206 may include more (or fewer) components than those shown in FIG. 3. It is not necessary, however, that all of these generally conventional components be shown in order to provide an enabling disclosure.

The content server 206 includes a processing unit 302, a network interface 304, a non-transitory computer-readable medium drive 306, an input/output device interface 308, and a memory 310, all of which may communicate with one another by way of a communication bus. As illustrated, the content server 206 is optionally associated with, or in communication with, an optional display 318 and an optional input device 320. The optional display 318 and optional input device 320 may be used in embodiments in which users interact directly with the content server 206, such as an integrated in-store kiosk or integrated component for inclusion in an automobile, boat, train, or airplane, for example. In other embodiments, the optional display 318 and optional input device 320 may be included in the user computing device 202 shown in FIG. 2. The network interface 304 may provide content server 206 with connectivity to one or more networks or computing systems. The processing unit 302 may thus receive information and instructions from other computing systems (such as the user computing device 202) or services via a network. The processing unit 302 may also communicate to and from memory 310 and further provide output information for the optional display 318 via the input/output device interface 308. The input/output device interface 308 may accept input from the optional input device 320, such as a keyboard, mouse, digital pen, touch screen, or gestures recorded via motion capture. The input/output device interface 308 may also output audio data to speakers or headphones (not shown).

The memory 310 contains computer program instructions that the processing unit 302 executes in order to implement one or more embodiments of the in-vehicle gaming system. The memory 310 generally includes RAM, ROM and/or other persistent or non-transitory computer-readable storage media. The memory 310 may store an operating system 314 that provides computer program instructions for use by the processing unit 302 in the general administration and operation of the content server 206. The memory 310 may further include other information for implementing aspects of the in-vehicle gaming system. For example, in one embodiment, the memory 310 includes a user interface module 312 that facilitates generation of user interfaces (such as by providing instructions therefor) for display upon a computing device such as the user computing device 202. For example, a user interface may be displayed via a navigation interface such as a web browser installed on a user computing device 202. In addition, memory 310 may include or communicate with the content data store 208. Content stored in the content data store 208 may include various types of items of content as described in with respect to FIG. 2.

In addition to the user interface module 312, the memory 310 may include a content customization module 316 that may be executed by the processing unit 302. In one embodiment, the content customization module 316 performs the content customization aspects of the in-vehicle gaming system. As will be explained in more detail below, in some embodiments, the in-vehicle gaming system identifies the user or users, and customizes the gameplay and game content for that particular user or users. For example, once the user is identified, the content customization module 316 further identifies characteristics of the user that may be relevant to game content customization. Such characteristics may include, for example, the user's age or education, the user's interests, or the content that the player owns, such as books, audiobooks, movies, or music, among other things. Thus, in the example of a trivia game, the content customization module 316 may create content for the trivia questions that is drawn from information or themes of content the player owns. In another example, the difficulty level of the content may be adjusted by the content customization module 316 based on the user's characteristics. If, for example, the user answers a number of difficult questions wrong, the questions may be adjusted to be of a type that are generally easier to answer. In this way, the content of the in-vehicle game may be dynamically generated or adjusted by the content customization module 316 based on the identity of the user.

As will be discussed further below with reference to FIGS. 5 and 6, the content customization module 316 may also perform dynamic adjustments or modifications to the gameplay to account for the distraction of the user/driver of the vehicle in which the in-vehicle gaming system is being used. The content customization module 316 may monitor a number of environmental factors as the driver uses the in-vehicle gaming system to assess driver distraction. These factors may include, for example, the driver's driving behavior, other people in the vehicle and their locations and actions, the speed and location of the vehicle, the environment surrounding the vehicle, and the weather, among others.

Thus, the driver may begin playing the game in the normal gameplay state, but the gameplay state may be modified by the content customization module 316 to reduce driver distraction. Modifications to the gameplay state may include changing the focus of the game, changing the game difficulty, and reducing the volume of the game, among other things. For example, in the trivia game example, as the user/driver answers questions, the content of each subsequent question may be made easier or more difficult. The content customization module 316 may also completely interrupt gameplay, or end the game, in response to the mentioned environmental factors to reduce driver distraction. The functioning and example routines of the content customization module 316 will be further explained below in reference to FIGS. 5-8.

Alternatively, the content customization module 316 may be implemented in hardware, or may consist of multiple elements or modules, some or all of which may not be located in the content server 206. For example, in some embodiments the content customization module 316 is implemented partially or entirely by one or more user computing devices 202, or in a vehicle embedded computing device, such as the vehicle embedded computing device 402 of FIG. 4. In this alternative, the content customization would be performed in either the user computing device 202 or the vehicle embedded computer device 402. Accordingly, the user computing device 202 may include a content customization module 316 and other components that operate similarly to the components illustrated as part of the content server 206, including a processing unit 302, network interface 304, non-transitory computer-readable medium drive 306, input/output interface 208, memory 310, user interface module 312, and so forth. One of skill in the art will appreciate that the content customization module 316 could additionally be implemented in a number of different ways, and at different locations within the in-vehicle gaming system that are not explicitly disclosed here. For example, the content customization module 316 could alternatively be a stand-alone module external to the content server 206, but which communicates with the content server 206, the user computing device 202, or the content server 206 and the user computing device 202 individually or simultaneously.

Figure 4:
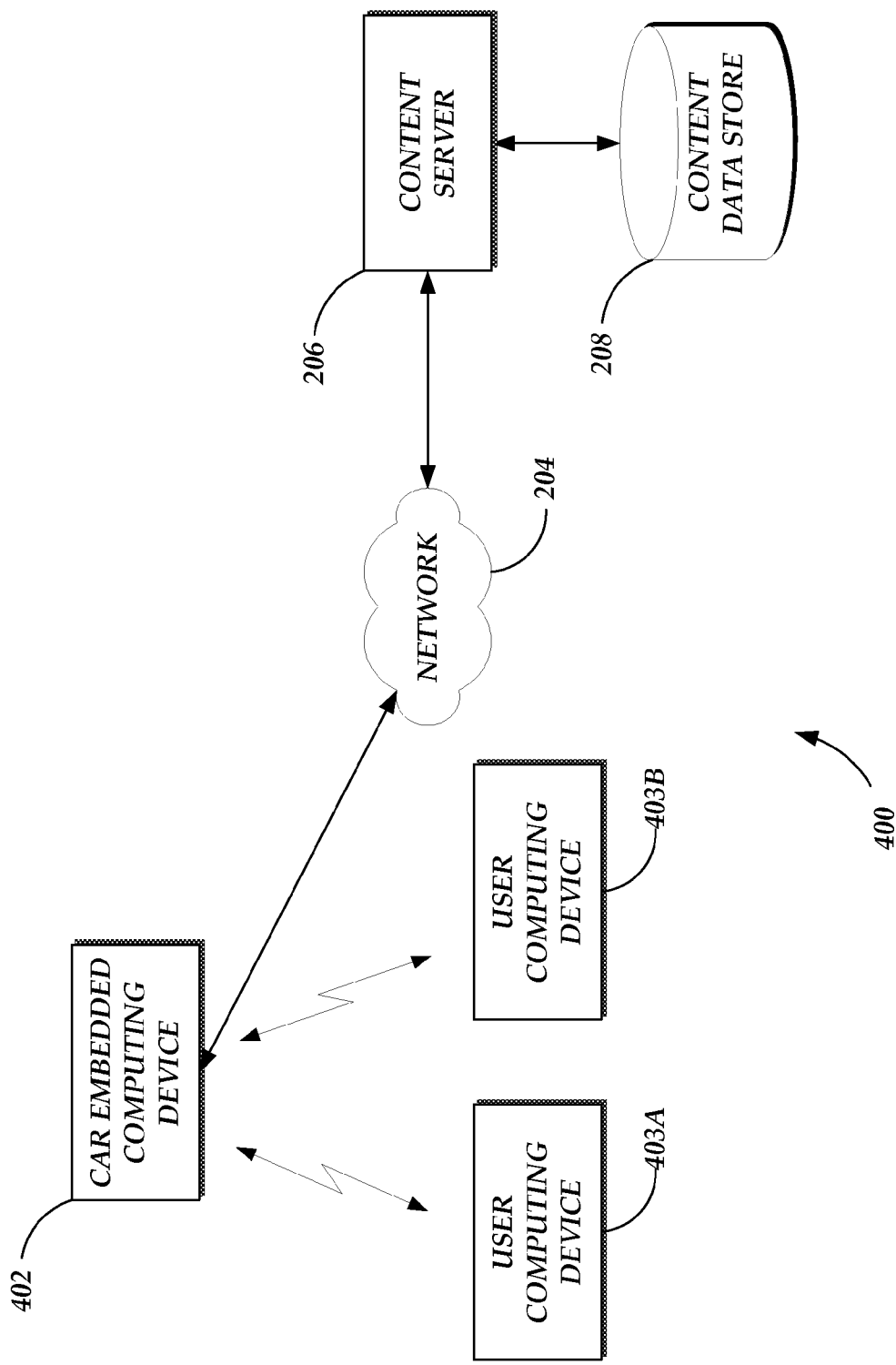
FIG. 4 is a schematic diagram of another illustrative network environment in which an in-vehicle gaming system may operate.

FIG. 4 illustrates another network environment 400 in which the in-vehicle gaming system may operate. In this embodiment, the network environment 400 may include one or more user computing devices 403 (such as user computing devices 403A-403B), a vehicle embedded computing device 402, a network 204, a content server 206, and a content data store 208. The constituents of the network environment 400 may be in communication with each other either locally or over the network 204. For example, as illustrated in FIG. 4, the user computing device 403 are in communication with the vehicle embedded computing device 402, the vehicle embedded computing device 402 is in communication with the network 204, the network 204 is in communication with the content server 206, and the content server 206 is in communication with the content data store 208.

Many of the aspects of the network environment 400 are analogous to those of the network environment 200 described above in reference to FIG. 2. Accordingly, any alternatives or characteristics discussed above with respect to similar components should be understood to apply equally here. For example, the network 204 of FIGS. 2 and 4 are understood to be a similar component which functions as described above. Likewise with respect to the content server 206, the content data store 208, and the user computing devices 403A-403B (which are analogous to the user computing devices 202A-202C of FIG. 2). Thus, primarily the differences in operation between the network environment 200 of FIG. 2 and the network environment 400 of FIG. 4 will be described in reference to FIG. 4.

Referring to FIG. 4, the vehicle embedded computing device 402 may be any computing vehicle embedded device capable of communicating over the network 204, such as a laptop or tablet computer, personal computer, personal digital assistant (PDA), hybrid PDA/mobile phone, mobile phone, in-vehicle computer device or navigation system, global positioning system (GPS) device, electronic book reader, audiobook player, digital media player, video game console, television, one or more processors, integrated components for inclusion in computing devices, appliances, electronic devices for inclusion in vehicles or machinery, gaming devices, or the like. The vehicle embedded computing device 402 may communicate over the network 204, for example, to obtain content from the content server 206, or to transmit user information or answers to the content server 206. Similarly, the user computing devices 403A-403B may communicate through the vehicle embedded computing device 402 and the network 204 with the content server 206. In some instances, the user computing devices 403A-403B may communicate with each other through the vehicle embedded computing device 402 as well, for example, user computing device 403A may be able to communicate with user computing device 403B. Alternatively, the user computing devices 403A-403B may be able to communicate with each other directly.

The vehicle embedded computing device 402 may generally be capable of conveying content to a user of the vehicle embedded computing device 402, and receiving input from the user. For example, the vehicle embedded computing device 402 may be capable of playing audio content by directing audible output through speakers, headphones, or the like. The vehicle embedded computing device 402 may also be capable of displaying images or video content on a display screen. The vehicle embedded computing device 402 may further be capable of conveying questions about an item of content; receiving selections by the user; providing tasks for the user to perform in order to select an answer or content; receiving audio or gesture input; and performing other functions to implement the in-vehicle gaming system. Additionally, the vehicle embedded computing device 402 may be capable of conveying, playing, and/or displaying any of the aforementioned to the user by transmitting the information to the user computing device 403. Thus, the user or users of the in-vehicle gaming system of FIG. 4 may interact with the system (in other words, play the game) through the vehicle embedded computing device 402, the user computing device 403, or both.

In some embodiments, the vehicle embedded computing device 402 also stores one or more items of content in an electronic data store. For example, the vehicle embedded computing device 402 may include one or more hard disk drives, solid state memories, and/or any other type of non-transitory computer-readable storage medium accessible to or integrated within the vehicle embedded computing device 402. These items may be retrieved from storage and conveyed by vehicle embedded computing device 402. These items of content may include one or more questions as described above.

Communications between the vehicle embedded computing device 402 and the user computing device 403 may be through any wired, wireless, or other communications method. For example, such communication may be accomplished through WiFi, Bluetooth, Cellular, Radio Frequency (RF), USB, Near Field Communications (NFC), or the like. Protocols and components for communicating via the Internet or any of the other aforementioned types of communication protocols are well known to those skilled in the art of computer communications and thus, need not be described in more detail herein.

The vehicle embedded computing device 402 may be embodied in a plurality of components, each executing an instance of the respective content of the vehicle embedded computing device 402. A server or other computing system implementing the vehicle embedded computing device 402 may include a network interface, memory, processing unit, and non-transitory computer-readable medium drive, all of which may communicate with each other by way of a communication bus. Moreover, a processing unit may itself be referred to as a computing device. The network interface may provide connectivity over the network 204 and/or other networks or computer systems. The processing unit may communicate to and from memory containing program instructions that the processing unit executes in order to operate the vehicle embedded computing device 402. The memory generally includes RAM, ROM, and/or other persistent and/or auxiliary non-transitory computer-readable storage media.

It will be recognized that many of the devices described above are optional and that embodiments of the network environment 400 may or may not combine devices. Furthermore, devices need not be distinct or discrete. Devices may also be reorganized in the network environment 400. For example, the content server 206 may be represented in a single physical server or, alternatively, may be split into multiple physical servers. The content server 206 and the content data store 208 may be combined. The entire content server 206 may be represented in the vehicle embedded computing device 402 or a single user computing device 403 as well.

In operation, a user interacts with the user computing device 403 and/or the vehicle embedded computing device 402 to play a game. In an embodiment, the vehicle embedded computing device 402 is an embedded display as depicted with the in-vehicle display 108 in FIG. 1. In another embodiment, the user computing device 403 is a handheld or portable device, such as a mobile phone, tablet or smartphone. The user may interact with the user computing device user computing device 403 and/or the vehicle embedded computing device 402 through, for example, touch, voice, or gesture. For example, in one embodiment, the vehicle embedded computing device 402 is an embedded display, such as an in-vehicle navigation system display. In this embodiment, the user or player interacts with the in-vehicle game by touching the display to select answers to questions. Alternatively, the users may interact with the game through the user computing devices 403A-403B. In another embodiment, the in-vehicle game may be voice controlled, such that the user interacts with the in-vehicle game by speaking. In this example, the vehicle embedded computing device 402 and/or the user computing device 403 provides a means for voice input, and output. This may include, for example, questions being presented to the user or player as text or pictures on the display, or as sounds, such as spoken words, through the vehicle audio system.

The vehicle embedded computing device 402 communicates with the content server 206 to request game content. The game content request is processed by the content server 206, and necessary information is requested from the content data store 208. The necessary content information is then transmitted back to the content server 206, and then to the vehicle embedded computing device 402. The user of the in-vehicle game system is then presented with the game content at the vehicle embedded computing device 402, and may respond. Alternatively, the vehicle embedded computing device 402 may transmit the game content to the user computing device 403, where it is then presented to the user of the in-vehicle gaming system. Responses from the user are then transmitted back to the content server 206 through the network 204.

In an alternative embodiment, the network environment 400 may include multiple vehicle embedded computing devices 402 communicating with multiple user computing devices 403.

Alternatively, some or all game content may be stored on the vehicle embedded computing device 402 and/or the user computing device 403 in, for example, electronic memory. In this embodiment, the in-vehicle game system may not require the content server 206 or the content data store 208, but the functionality of these components may be incorporated in the vehicle embedded computing device 402 and/or user computing device 403.

Alternatively, as discussed above, the content customization module 316 of FIG. 3 may be implemented entirely or partially in the vehicle embedded computing device 402.

Figure 5:
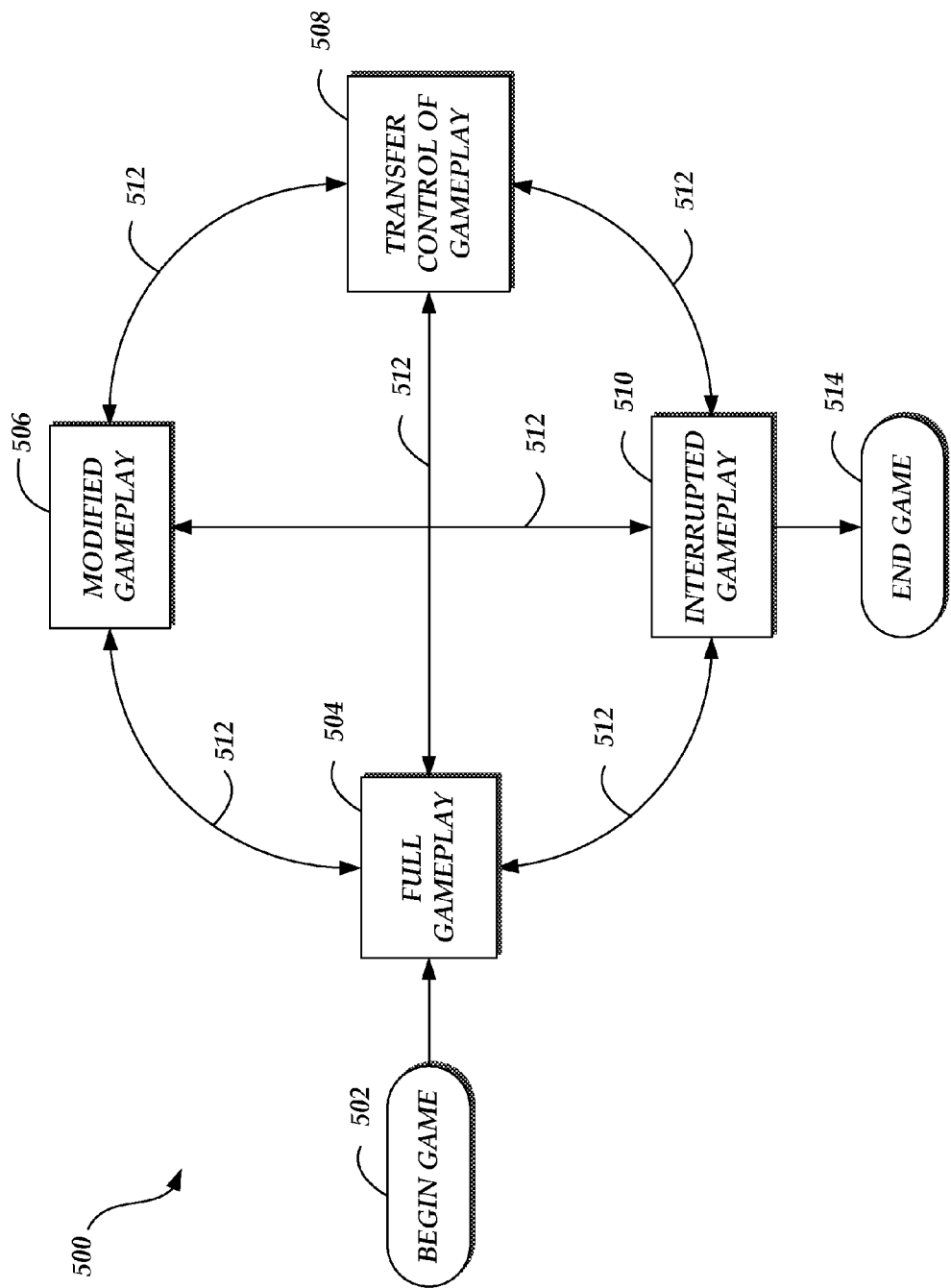
FIG. 5 is a flow diagram depicting illustrative gameplay adjustment states.

FIG. 5 shows a flow diagram illustrating the various gameplay adjustment states referenced above with respect to preventing driver distraction. For this figure (and additionally for FIGS. 6 and 8), arrows indicate paths that may be selected by a user, by one or more users, or automatically by relevant in-vehicle gaming system components (such as, for example, the content server 206 or the content customization module 316).

The content customization module 316 may perform dynamic adjustments or modifications to the gameplay to account for the distraction of the user/driver of the vehicle in which the in-vehicle gaming system is being used. The content customization module 316 may monitor a number of environmental factors as the driver uses the in-vehicle gaming system to assess driver distraction. These factors may include, for example, the driver's driving behavior, other people in the vehicle and their locations and actions, the speed and location of the vehicle, the environment surrounding the vehicle, and the weather, among others. The use of these environmental factors will be discussed in further detail below in reference to FIG. 6.

Thus, the driver may begin playing the game in the normal gameplay state, but the gameplay state may be modified by the content customization module 316 to reduce driver distraction. Modifications to the gameplay state may include changing the focus of the game, changing the game difficulty, and reducing the volume of the game, among other things. For example, in the trivia game example, as the user/driver answers questions, the content of each subsequent question may be made easier or more difficult. The content customization module 316 may also completely interrupt gameplay, or end the game, in response to the mentioned environmental factors to reduce driver distraction. The functioning and example routines of the content customization module 316 will be further explained below in reference to FIGS. 5-8.

Referring to FIG. 5, gameplay states 500 are shown. The gameplay states 500 will now be described in reference to FIGS. 2, 3, and 5. The user of the in-vehicle gaming system chooses to begin a game at begin game state 502. At this point the in-vehicle game is activated, the user is identified, and the gameplay proceeds to full gameplay state 504. In full gameplay state 504, the user computing device 202 is communicating with the content server 206 through the network 204. Additionally, content is being drawn by the content server 206 from the content data store 208, customized by the content customization module 316, and transmitted back and presented to the user at the user computing device 202.

The gameplay states 500 include environmental input-induced gameplay state change arrows 512, which indicate optional gameplay state transitions that may occur in response to environmental inputs. As will be described below in reference to FIG. 6, environmental inputs and factors are used to calculate a distraction index. That is, the environment of the user of the in-vehicle gaming system is used by the in-vehicle gaming system, and specifically in a particular embodiment, the content customization module 316, to calculate a distraction index. The distraction index represents the degree of distraction that the user is experiencing. Such an index is useful, especially in the case of the driver of a vehicle, for changing the state of the gameplay to reduce driver distraction.

Each gameplay state includes a related distraction index range. Anytime during gameplay that the distraction index falls outside of the range of the current gameplay state, that gameplay state is transitioned to the now appropriate gameplay state. Thus, as an example, the distraction index may include numbers 0 to 9, 0 indicating no distractions, and 9 indicating severe distractions. In this example, gameplay will remain in the full gameplay state 504 if the distraction index remains between the values of 0 and 1. If, however, the distraction index changes to a value between 2 and 4, the state will transition along one of the environmental input-induced gameplay state change arrows 512 to a modified gameplay state 506. In the modified gameplay state 506, the content customization module 316 dynamically modifies the gameplay in various ways to reduce the driver involvement, thereby enabling the driver to focus more fully on driving and reducing the risk of accident. Modifications that may be made to the gameplay in the modified gameplay state 506 will be described below.

Continuing the example, if the distraction index changes to a value between 5 and 7, the state will transition along one of the environmental input-induced gameplay state change arrows 512 to a transfer control of gameplay state 508. In the transfer control of gameplay state 508, the content customization module 316 dynamically modifies the gameplay in various ways to reduce the driver involvement further. For example, if there are other users/players in the vehicle, gameplay control may be transferred to those users, and the driver may be excluded from participation in the gameplay, thus further enabling the driver to focus more fully on driving and further reducing the risk of accident. For example, if the driver is in control of the gameplay as the designated answerer of the trivia questions being presented to the users, the control of the gameplay may be transferred to another user other than the driver.

Still continuing the example, if the driver of the vehicle is the only user of the in-vehicle gaming system and the distraction index changes to a value between 5 and 9, or alternatively, if the driver of the vehicle is not the only user of the in-vehicle gaming system and the distraction index changes to a value between 8 and 9, the state will be transition along one of the environmental input-induced gameplay state change arrows 512 to an interrupted gameplay state 510. In the interrupted gameplay state 510, the content customization module 316 dynamically interrupts the gameplay to prevent any further distraction to the driver of the vehicle.

From this point, the game may end at an end game state 514, or alternatively, if the distraction index changes to be within the range of a gameplay state of than the interrupted gameplay state 510, the gameplay state will then transition along one of the environmental input-induced gameplay state change arrows 512 to the appropriate state.

It is to be understood that additional embodiments fall within that scope of the present disclosure that use a distraction index other than the one described in the above example. One of skill in the art would understand, for example, that a different range of numbers may be chosen. Alternatively, the distraction index may not be represented by numbers, but in some other way, such as by colors or signals.

Alternatively, the gameplay states 500 may include additional states, or may include fewer states than those disclosed here. For example, in the instance of an in-vehicle game being played by a driver alone, the transfer control of gameplay state 508 may not be part of the gameplay states 500. Additionally, greater granularity in gameplay may be found within any of the aforementioned states. For example, the modified gameplay state 506 may include various sub-states that modify the gameplay in different ways depending on the types of distractions being experienced by the driver, or other characteristics of the driver. For example, in the instance of a trivia game, the difficulty level of the content of the gameplay may be adjusted based on the user's ability to answer questions. If, for example, the user answers a number of difficult questions wrong, the questions may be adjusted to be of a type that are generally easier to answer. In another embodiment, the user of the in-vehicle gaming system may be a driver or passenger in an automated or partially automated vehicle (such as a self-driving car or an airplane with autopilot). In such an embodiment, the gameplay states 500 available may take into account the current driving mode of the vehicle. For example, additional gameplay states may be available when, for example, a car is in a cruise-control mode, requiring less attention from the driver. Similarly, anticipated and/or in-process driving mode changes may be taken into account.

Examples of modified gameplay include, but are not limited to: adjusting the level of difficulty; enabling or disabling aspects of the game; adjusting the time to answer; adjusting the number of possible answers (for example, offering two possibly correct answers instead of 3 in a trivia game); simplifying the game or making the game more difficult; changing the volume of the game; speeding up or slowing down the game pace; shifting game control to another player; excluding a certain player from participating; handing over complex game control to another player; basing player participation or roles on their personal profile or their location in the vehicle; among other things.

In an embodiment, the transfer control of gameplay state 508 may include excluding the driver/user from participating in the game. For example, the in-vehicle gaming system may include voice recognition or face recognition components, allowing the in-vehicle gaming system to recognized the driver's voice or face, and ignore input from the driver.

In an embodiment, the gameplay state change may be so subtle that the driver may not notice the change. In an embodiment, gameplay state changes may be based at least in part on the user's responses gameplay prompts (for example, questions). For example, a user's correct response to a question may result in, for example, a speeding up of the game pace. In another embodiment, additional gameplay states may include, for example, changes in characteristics or operations of the vehicle. Such characteristics or operations of the vehicle may include, for example, temperature change, windows going up or down, a sun roof opening or closing, the maximum speed of the vehicle being reduced, among other possibilities. Thus, in a trivia game, for example, an incorrectly answered trivia question may result in a gameplay state change comprising a temperature change in the cabin of the vehicle (such as an air conditioner turning off or on). In yet a further embodiment, incorrect and/or correct responses to gameplay elements may result in a gain or loss of money and/or points related to the in-vehicle game.

Figure 6:
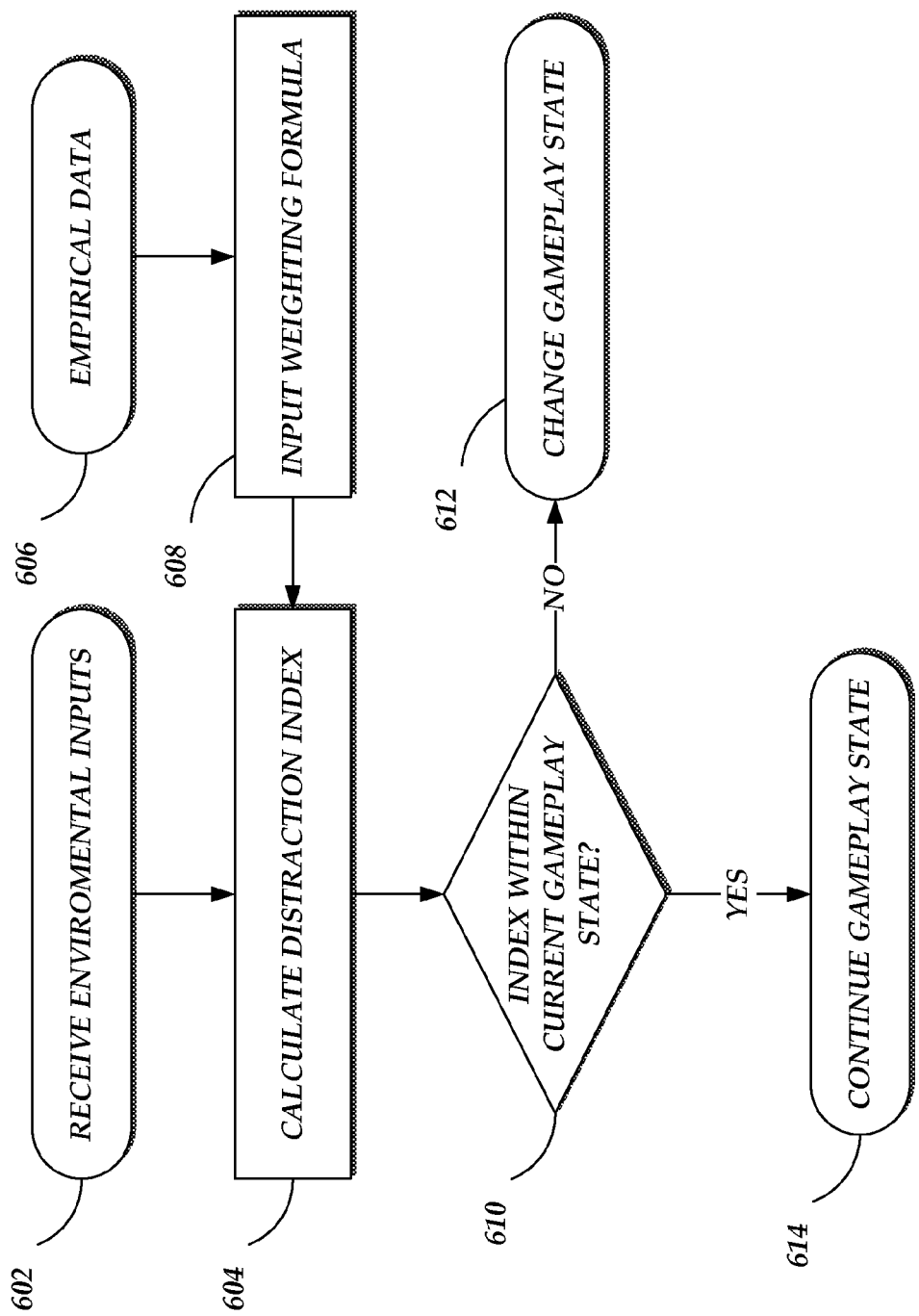
FIG. 6 is a flow diagram depicting an illustrative routine for adjusting gameplay states.

FIG. 6 shows a flow diagram depicting an illustrative routine for adjusting gameplay states. The illustrative routine for adjusting gameplay states will be described with reference to FIGS. 2, 3, 5, and 6. In general, FIG. 6 depicts an example process for generating the distraction index referenced above, and how the distraction index impacts the gameplay state.

At block 602 environmental inputs are received by the in-vehicle gaming system. These inputs or data may be sensed or gathered by the user computing device 202, or by the content server 206, among other components. For example, the content server 206 may gather information through the network 204 from third-party data sources. Environmental data gathered via the Internet may include, for example, the current weather where the vehicle is located, current traffic conditions, and scenery that the user may be experiencing, among other data. The user computing device 202 may include a GPS sensor, an ambient light sensor, a proximity sensor, and an accelerometer, among other sensors, that may provide environmental inputs and data. In the case of a vehicle embedded device, or the user computing device 202 in communication the vehicle, vehicle sensor inputs may be gathered. If the user has been identified then user information may be gathered.

Examples of environmental data and inputs that may be gathered and used by the in-vehicle gaming system include, but are not limited to: inputs from the vehicle sensors including, for example, cruise control (automatic vehicle speed control system) activation, vehicle speed, vehicle ventilation or air conditioning system activation, the RPM (rotations per minute) of the vehicle engine, acceleration of the vehicle, vehicle fuel level, vehicle fuel efficiency (current miles per gallon), whether the headlights are activated, On-Board Diagnostic (OBD) information (including the performance of the vehicle, mechanical malfunctions, the vehicle's maintenance schedule), and the type of vehicle, among other things; the number of people in the vehicle; the locations of people in the vehicle; the identities of people in the vehicle; the characteristics of people in the vehicle; the location of the vehicle or user; nearby landmarks; weather; humidity; elevation; the number of seat belts fastened in the vehicle; the number of vehicle occupants who do not have their seat belts fastened; the noise level in the vehicle; the temperature in the vehicle; traffic conditions including stop-and-go traffic, accidents and other obstructions; the proximity of emergency vehicles or sirens; various types of driving conditions include the visibility level (for example, whether fog or rain has limited the visibility level of the driver); the existence of traffic congestion ahead of the driver; historical data and information about the road, traffic conditions, and weather; the time of day and the light level outside; the proximity of other vehicles to the user's vehicle; irregular vehicle motion; and honking by the user or others near the user's vehicle.

Additionally, data and inputs disclosed below in reference to FIG. 8 for game customization may also be used as inputs for calculating the distraction index.

At block 606, empirical data is used in developing an input weighting formula in block 608. Empirical data may include, for example, information on the causes of driver distraction, and the degree of distraction caused by various environmental stimuli. For example, such data may include information that drivers are highly distracted by stop-and-go traffic, moderately distracted by rainy weather, and not significantly distracted by billboards. This data may then be used in developing the input weighting formula, which is used in calculating the distraction index. The formula would, in this example, assign a greater distraction weight to an environment that included stop-and-go traffic, a lesser distraction weight to an environment that included rainy weather, and very little distraction weight to an environment that included billboards.

Then, at block 604, the input weighting formula is combined with the received environmental inputs, and a distraction index is calculated. The distraction index is an indication of the distraction level of the driver. The distraction index may be directly related to the distraction level of the driver, and may be correlated with the distraction level of the driver. Further, the distraction index may be calculated by the content customization module 316. Next, in block 610, the content customization module 316 compares the calculated distraction index with the current gameplay state's range of acceptable distraction index values. If the calculated distraction index is outside of the range of the current gameplay state distraction index range, the process proceeds to block 612. In block 612, the gameplay state is changed to the appropriate state as described above with respect to FIG. 5. If the calculated distraction index is within the range of the current gameplay state distraction index range, the process proceeds to block 614. In block 614, the gameplay state remains in the current state.

The distraction index is calculated by the content customization module 316. The distraction index is calculated frequently so that the gameplay state may be adjusted quickly when new environmental conditions arise. The distraction index may be calculated, for example, many times each second. Alternatively, the distraction index is calculated less frequently so as to preserve data bandwidth and computational resources. For example, the distraction index may be calculated every second, every few second, a few times a minute, every minute, or even less frequently. In an embodiment, the frequency of the distraction index calculation is dependent on the type of game being played by the user or users. For example, a trivia game may necessitate only an infrequent update of the distraction index, while another type of game may require more frequent update.

In an embodiment, the distraction index is calculated based on a heuristic formula to increase the speed of the calculation. In an embodiment, the distraction index is calculated by a dedicated module other than the content customization module 316, and the index is then communicated to the content customization module 316.

In an alternative embodiment, the types of environmental inputs or distractions are taken into account by the content customization module 316 in modifying the gameplay. This embodiment may include 'distraction type' data in addition to the simple distraction index considered when modifying the gameplay. For example, an emergency vehicle, such as an ambulance, in the vicinity of the vehicle may increase the distraction index, but may cause a simple lowering of the volume of the game being played by the driver, as opposed to simplifying of the question difficulty. Alternatively, such an event may have only a minor impact on the distraction index, but the content customization module 316 may be configured to cause the gameplay to shift to the interrupted gameplay state 510 because of the importance of being aware of emergency vehicles.

In yet another embodiment, data personal to the identified user may be used in calculating the distraction index. In this case, the privacy of personal data would be protected. Information that a particular user is easily distracted in general, or easily distracted by certain things, may be used by the content customization module 316 in calculating the distraction index. For example, greater weight may be given to distractions that have a greater impact on a particular user of the in-vehicle gaming system. In an embodiment, the user's driving history, including safety record or traffic infractions may be taken into account when calculating the distraction index. In another embodiment, the model and/or type of the vehicle, as well as the user's history and experience in relation to the vehicle may be taken into account in calculating the distraction index. In yet a further embodiment, the in-vehicle gaming system may track the user's eye position, eye focus, and/or eye movement, among other things, to further determine the user's distraction, sleepiness, and/or attention. Alternatively, the in-vehicle gaming system may use other means to measure the user's attentiveness and/or sleepiness in determining the distraction index. Further, the model and/or type of the vehicle, the user's driving history, the user's experience with the vehicle, the user's eye movements, and the user's sleepiness, as well as other factors listed above, may be considered environmental factors that may influence the calculation of the distraction index and/or modification of the in-vehicle gaming system.

Environmental inputs and data may also be used in game content customization, as will be described below in reference to FIG. 8.

In an embodiment, the modified gameplay state 506 may allow the driver to be more engaged in the gameplay when the cruise control of the vehicle is activated, than when it is deactivated.

In an embodiment, the user of the in-vehicle gaming system is notified and the gameplay is interrupted if sirens are detected, or if emergency vehicles are in close proximity to the user's vehicle.

In an embodiment, the in-vehicle gaming system includes a distraction or safety meter that indicates the distraction level of the driver, and which is related to the distraction index. In an embodiment, the distraction or safety meter is displayed to the driver and/or other users of the in-vehicle gaming system. Alternatively, the in-vehicle gaming system may include a caution rating or score related to the distraction index or to a particular in-vehicle game.

Figure 7:
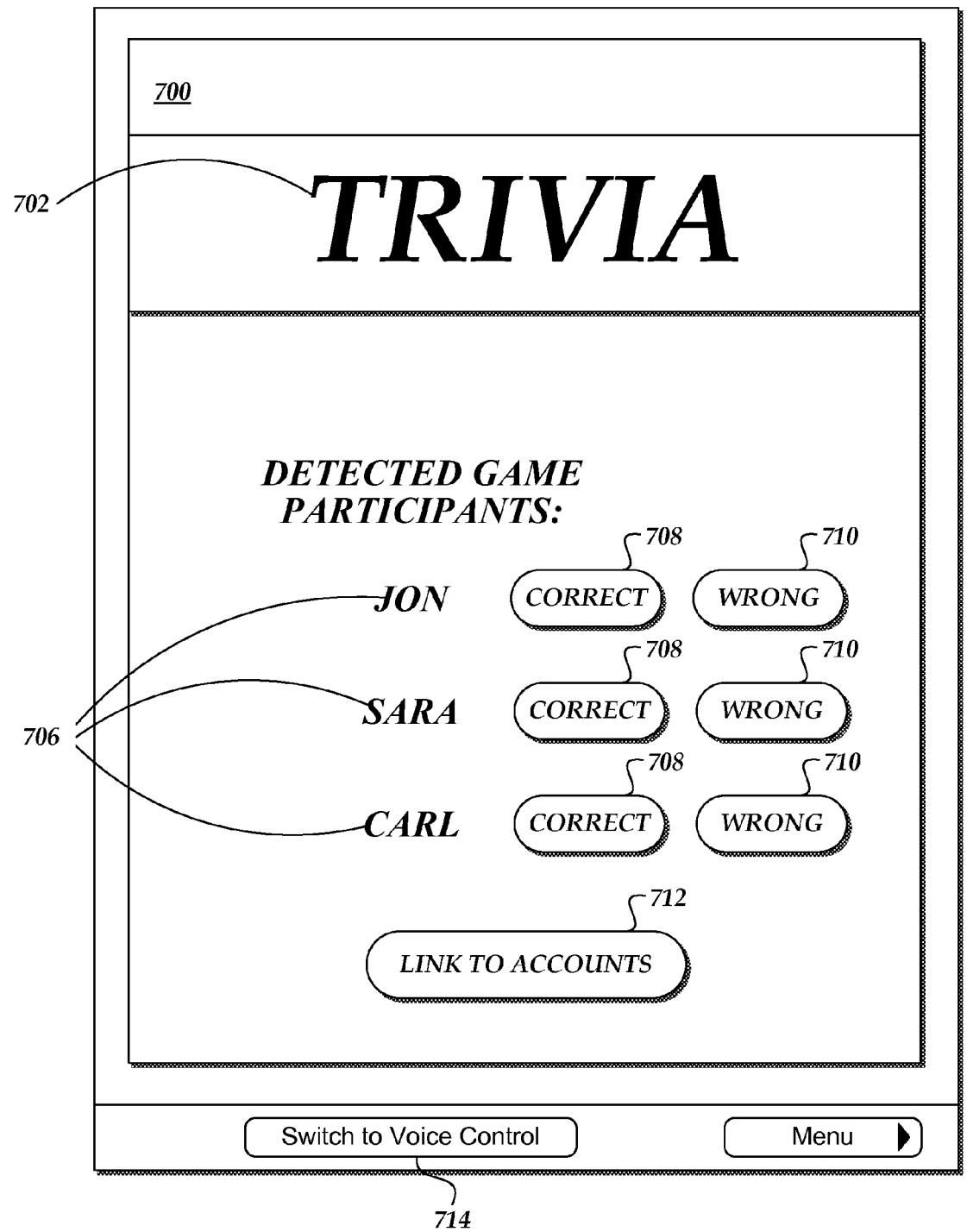
FIG. 7 is a pictorial diagram depicting an example user interface for an in-vehicle gaming system.

FIG. 7 is a pictorial diagram depicting an example user interface display 700 for the in-vehicle gaming system. The user interface 700 includes a game title 702, a list of detected game participants 706, correct buttons 708, wrong buttons 710, a link to accounts button 712, and a switch to voice control button 714. The correct buttons 708, wrong buttons 710, link to accounts button 712, and switch to voice control button 714 consist of selectable user interface controls.

The user interface 700 may communicate with the user computing device 202, the user computing device 403, or the vehicle embedded computing device 402. Alternatively, the user interface 700 may be shown on a display attached to any of the user computing device 202, user computing device 403, or vehicle embedded computing device 402.

In the present embodiment, the user of the in-vehicle gaming system interacts with the in-vehicle gaming system through the user interface 700. The users of the game have chosen to participate in a trivia game, and the in-vehicle gaming system has detected three participants, listed as the detected game participants 706. Users may be detected by the in-vehicle gaming system based on any number of the user's characteristics. For example, the in-vehicle gaming system may obtain seat adjustment sensor data from the vehicle embedded computing device 402. This data may be used by the content server 206 for determining the identity of the user occupying a particular seat of the vehicle. Alternatively, weight sensor data may be used by the in-vehicle gaming system to detect the occupant of a particular seat of the vehicle. The in-vehicle gaming system may gather and store historical data about users, thus enabling the system to guess with increasing accuracy the identity of the users. This system may require that the user initially self-identify. Subsequently, however, the system will be able to detect the identity of the user.

Examples of data and inputs that may be gathered and used by the in-vehicle gaming system in determining the identity of the users may include, but are not limited to: the user's position in the vehicle; the way user's seat in the vehicle is adjusted; the user's seat location in the vehicle; historical data about the locations the user has sat in the vehicle and the way the user has adjusted their seat; the user's height, weight and other physical characteristics; facial recognition and voice recognition of the user; data and communication with the user's mobile phone or smartphone including through, for example, Bluetooth; the user's key; the user's GPS location as provided by their mobile phone or smartphone; the user's account profile or other identifying information (described in further detail below); the user's social-graph information (including, for example, their friends and relatives as identified from public data on the Internet or, with permission, through their social network accounts); and other input from the user or confirmation by the user of their identity.

In an embodiment, users of the in-vehicle gaming system are authenticated, by, for example, providing self-identifying information or a password. Alternatively, users may be authenticated through biometric identification such as voice or face recognition, fingerprint scan, or eye scan (such as iris or retina), among other thing.

In the user interface 700, the in-vehicle gaming system has detected the three detected game participants 706 listed. The users are then prompted to confirm or deny their identity by pressing either the correct button 708 or wrong button 710 next to their respective names. The users are also given the option of linking the game to an account by pressing the link to accounts button 712. Linking to an account grants the in-vehicle gaming system access to additional personal information that may be relevant in content generation, as will be described below in reference to FIG. 8. Once the users have confirmed their identities, the game will proceed. In this example, the trivia game will proceed to ask trivia questions of the users.

The users have the option of pressing the switch to voice control button 714, which has the effect of allowing the in-vehicle game to be controlled by voice. Alternatively, the in-vehicle game may be voice controlled by default. It should be noted that the user interface 700 is an example of an interface of the in-vehicle gaming system. Other embodiments of the present disclosure may have interfaces significantly different than the one shown in FIG. 7, but which still fall within the scope of the present disclosure. One of skill in the art will appreciate that such an interface may be implemented in many different ways without departing from the spirit of the present disclosure.

In an embodiment, the in-vehicle gaming system does not include a user interface 700, but is entirely presented by audio, and voice controlled. In an embodiment, the in-vehicle gaming system interface is presented on a head-up display (or HUD), an embedded video screen, a smartphone or mobile phone, or the like. In another embodiment, the in-vehicle gaming system interface is projected onto a wall or window of the vehicle, or onto an eye piece worn by the users of the in-vehicle gaming system.

Figure 8:
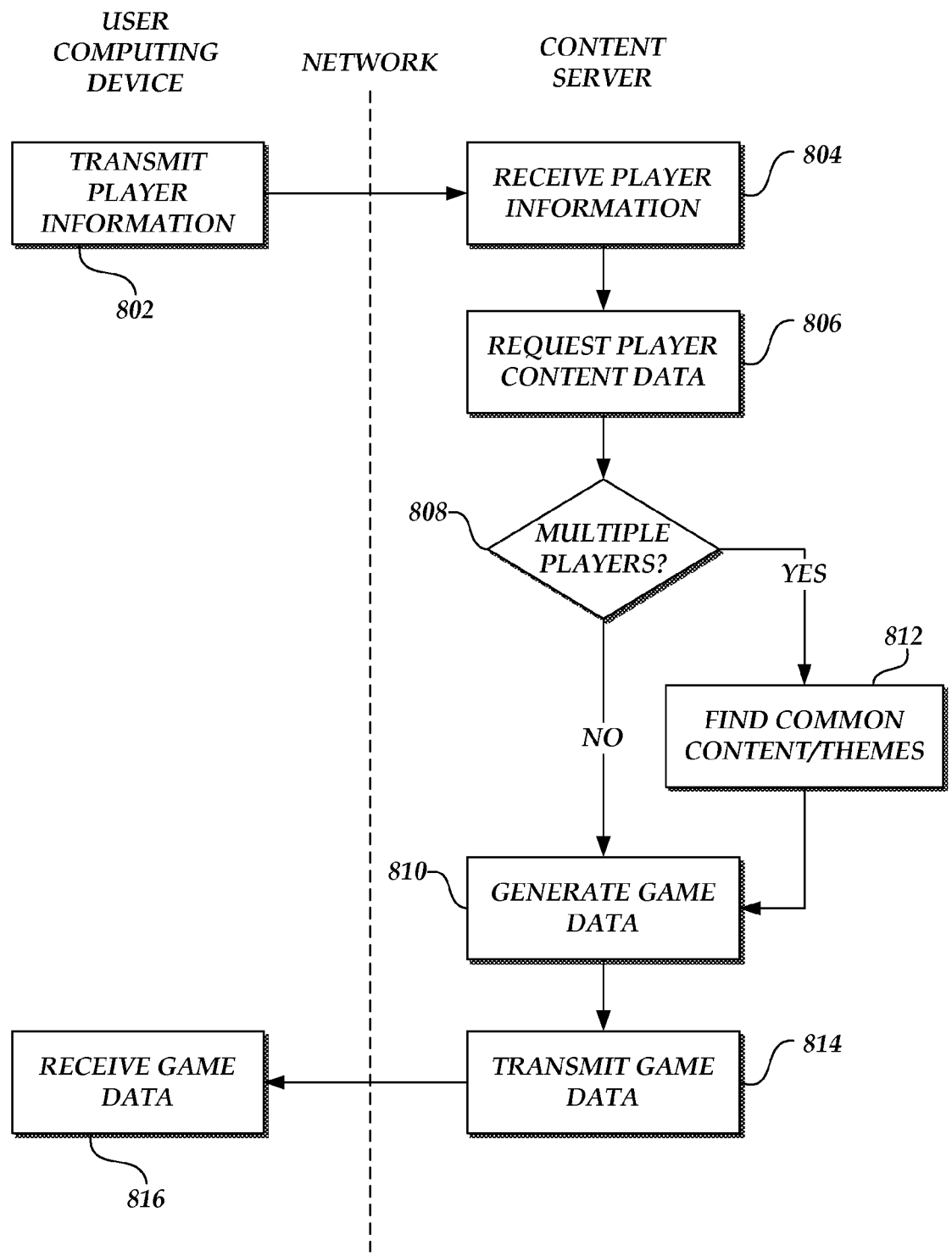
FIG. 8 is a flow diagram depicting an illustrative routine for generating gameplay data.

FIG. 8 shows a flow diagram depicting an illustrative routine for generating gameplay content and data. The illustrative routine for adjusting gameplay content and data will be described in reference to FIGS. 2, 3, and 8. In general, FIG. 8 depicts an example process for generating and modifying gameplay data and content to relate to the users of the in-vehicle gaming system.

At block 802, the user computing device 202 transmits player information across the network 204 to the content server 206. Player information may include any of the user identifying information discussed above with respect to FIG. 7. At block 804, the player information is received by the content server 206. At this point, the user/player identity is known by the content server 206. Next, at block 806, the content customization module 316 requests player content data. For example, the content customization module 316 may request any data relevant to the identified user from the content data store 208. Alternatively, the content customization module 316 may obtain data relevant to the user from the user account profile, from other linked accounts (such as social networking accounts), and from information generally public and available on the Internet, among other sources. The types of data gathered are discussed further below.

If multiple users are involved in the in-vehicle game, the content customization module 316 will obtain data relevant to each of the users. Next, at block 808, if there are multiple game players, the process proceeds to block 812. In block 812, the content customization module 316 may find common content among the data gathered relating to the users of the in-vehicle gaming system. Alternatively, the content customization module 316 may find common themes among the data gathered relating to the users of the in-vehicle gaming system. The process then continues to block 810. Alternatively, if there is only one user involved in the in-vehicle game, the process proceeds directly from block 808 to block 810.

In block 810, the content customization module 316 generates game data specific to the type of game being played, customized to the specific user or users (if there are more than one). For example, if a trivia game is being played, the trivia questions will be customized by the content customization module 316 to be specific to the user data and content obtained. More specifically, in the event of a single user/player, the trivia questions may be drawn from information or themes of content the player owns (such as movies, books, e-books, audiobooks, and music, among other things). In another example, the difficulty level of the content may be adjusted based on the user's characteristics, such as the user's age or education. In the event of multiple users/players, the in-vehicle gaming system may determine what content is the same, similar, or has common themes, among the group of users. For example, if all of the users have bought a particular movie, the content of the in-vehicle game may be drawn directly from the movie. Thus, in the trivia game example, the trivia questions would be about the movie or the characters in the movie, and would thereby apply to the whole group. In another example, if all the users have a common interest or theme, for example, they have all bought sports-related books, the content of the in-vehicle game may relate to that common interest, here, sports. Thus, in the trivia games example, the trivia questions would have a sports theme, and would be sports-related, and would thereby apply to the whole group. In another example, a similar content may be the basis for customization. Thus, if groups of users have all bought many books, or books of a certain genre or type, 'books' or 'books of a particular genre' may be the basis for the theme of the game content.

Once the game data has been generated, in block 814 the content server 206 transmits the game data back to the user computing device 202 over the network 204. In block 816 the game data is received by the user computing device 202, and thereby presented to the user playing the in-vehicle game.

Relevant data used by the content customization module 316 to customize the game content is not limited to user content data. It may also include, for example, environmental data and inputs such as those disclosed above in reference to FIG. 6. Each user may have a user account related to the in-vehicle gaming system, which may include user identifying information. Additionally, each user may link their user account with other user accounts in other services, for example, social networking accounts or the like. These accounts may provide user data to be used by the in-vehicle gaming system with user permission.

Examples of data that may be used in customizing game content include, but are not limited to: user account information such as profile information or social-graph information (friends and relatives); the user's age or education; the user's work history; the user's interests; the user's language; the user's location; the content that the user owns, has bought, rented, or consumed, such as, for example, books, e-books, audiobooks, movies, and music; the recency of the user's consumption of the any of the aforementioned content; the type of content that has recently been consumed, or that is typically consumed by the user; the user's current position in consumption of content (for example, the fact that the user is only half way through a certain book); information gathered from other sources and used in the production of game content (for example, information gathered from the Internet about a particular book that may be used as the basis of a question related to that book); the user's recent Internet searches or browsing history; the user's proximity to other in-vehicle gaming system users, such as other vehicles on the road or other people in the vehicle; user content that is common or similar or has similar themes among a group of users; user content that has no commonality among a group of users (which may, for example, be excluded from a game); information about the current route of the vehicle, or the user's destination (for example, book that have been written about the destination town, or fictional characters that lived in the destination town); the age of the youngest user in a group of users; type of vehicle driven by the user; and the number of users or passengers in the vehicle; among other things.

In an embodiment, the in-vehicle gaming system modifies the in-vehicle game to be appropriate for the number of users of the in-vehicle game, or the number of occupants in the vehicle.

In an embodiment, when a group of users are using the in-vehicle gaming system, the level of difficulty or maturity of the in-vehicle game is limited to a level appropriate for the youngest user. Alternatively, the in-vehicle game may periodically include content that is appropriate for the youngest user. Alternatively, the in-vehicle game may likewise be modified for the oldest user.

In an embodiment, the in-vehicle gaming system modifies or customizes the in-vehicle game content dynamically. Alternatively, the in-vehicle gaming system modifies or customizes the in-vehicle game content automatically, with or without user prompt.

In an embodiment, the in-vehicle game is not customized to the specific user or users of the in-vehicle gaming system. In this embodiment, the user identity may not be known, or the user may not want the game customized for them. Thus, the game content is generated by the content customization module 316 without user-specific customization. Alternatively, the game content may be customized for a specific user among the group of users, or for a subset of the group of users.

In another embodiment, the in-vehicle game is customized to a specific topic or theme requested by the user. For example, the user may desire a trivia question game on the topic of movie actors. Thus, the content customization module 316 may customize the game content to focus on the topic of movie actors.

In an embodiment, the user game data acquisition and game content customization described above are fully or partially performed by some other element of the in-vehicle gaming system, for example the user computing device 202. Game content may alternatively be stored locally in the user's vehicle, the user's mobile electronic device, or in the user computing device 202, and content customization may take place there, as opposed to the content server 206. Alternatively, the content server 206, or the functionality of the content server 206, may be included in the user computing device 202. Similarly, the aforementioned functionality may alternatively be fully or partially included in the vehicle embedded computing device 402 of the FIG. 4.

In an embodiment, all types of game modification disclosed herein are preformed simultaneously, or in conjunction with one-another. Additionally, all types of data, inputs, and information may be shared among the various routines and components of the in-vehicle gaming system. The information may include, for example, user data, environmental data, empirical data, content data, gameplay data, among other things. For example, the distraction index may be used in modifying gameplay content. User data may be used in calculating the distraction index. The gameplay state may influence the game content, and likewise game content may impact gameplay state. No particular method or routine embodied in the present disclosure is necessarily independent of the others, and interaction and/or overlap may occur in achieving the objectives of the in-vehicle gaming system.

In an embodiment, the user of the in-vehicle gaming system may begin a game, stop the game for a period of time, and then later resume the game where they left off. Alternatively, the user of the in-vehicle gaming system may begin a game in one location, or in a particular vehicle, and may continue that game in another location, or another particular vehicle, with or without stopping the game for a period of time. In an embodiment, the user of the in-vehicle gaming system may be identified by logging into the in-vehicle gaming system. Thus, the user may select for a number of existing game to resume. Alternatively, the user may create a new game based on themes or content of an existing game. The user may alternatively delete or end existing games. The user may also optionally add additional users into an existing game, or remove existing players from a game. Alternatively, the in-vehicle gaming system may suggest to the user resuming, or automatically resume, an existing game, or starting a new game.

Various types of games and gameplay fall within the scope of the present disclosure. Each of the various types of games and gameplay may include one or more users, in one or more locations. For example, multiple users may be participating in an in-vehicle game, but each player may be in a different vehicle or location. In some embodiments, some or all of the users participating in an in-vehicle game may not be in vehicles at a given time. For example, the in-vehicle gaming system may include users that are in their vehicles playing games with users that are outside of their vehicles. In an embodiment, the in-vehicle gaming system may be used whether or not the vehicle is moving. Alternatively, the in-vehicle gaming system may be used whether or not a driver is present. Alternatively, the in-vehicle gaming system may be used partially outside of the vehicle, or includes aspects that occur outside of the vehicle. In an embodiment, some users of the in-vehicle gaming system may be present in the same vehicle, while others are present together in another vehicle, or any other combination of the above.

In an embodiment, the in-vehicle gaming system may be played by multiple people in the same vehicle simultaneously. As described above, users of the in-vehicle gaming system may interact with the system through touch, voice, or gesture, among other things. The gameplay may be presented to the users in a single display, such as a vehicle embedded display, or each user may have their own display, such as the display associated with an in-vehicle entertainment system, or a smartphone. Alternatively, users may interact with the system through audio, either combined through the vehicle audio system, or individually through, for example, individual headphones and microphones. The in-vehicle gaming system may distinguish between users to receive voice commands or answers from specific users, among other things. In an embodiment, the in-vehicle gaming system may utilize face recognition to determine the identity or locations of particular users. In this embodiment, the in-vehicle gaming system may include a focusable microphone array for allowing only a particular user answer a question or participate in a portion of the game.

In an embodiment, the voice of an in-vehicle GPS unit is recognized by the in-vehicle gaming system and omitted from gameplay, similar to the way the driver's voice may be recognized and avoided to remove the driver from gameplay due to distraction concerns.

In an embodiment, the in-vehicle gaming system includes augmented reality displays, such as on the vehicle windshield or on glasses worn by the users, that may add game elements to what the player sees, such as, for example, dragons, or ghost drivers.

In another embodiment, the in-vehicle gaming system includes games that are guaranteed to not exceed a certain level of distraction under a given set of conditions. Alternatively, the in-vehicle gaming system includes games that are certified to not exceed a certain level of distraction under a given set of conditions. In an embodiment, the in-vehicle gaming system will not execute games, or allow games to be played, that may exceed a certain level of distraction under a given set of conditions, or that are not certified to not exceed a certain level of distraction under a given set of conditions.

In an embodiment, the in-vehicle gaming system may be played by multiple people in different vehicles simultaneously. Each vehicle may have one or more users/players that are interacting with the in-vehicle gaming system. In this embodiment, game content for each of the individual vehicles may be provided by separate in-vehicle devices, or by a central content server. Communications between vehicles, or individual user devices, such as smartphones, may be directly from vehicle to vehicle, or through the central content server. Communications among vehicles may be by audio or video, among other things. In this way, multiple vehicles can simultaneously participate in the same in-vehicle game.

Examples of the various types of games and gameplay modes that fall within the scope of the present disclosure, and which may be present in any of the embodiments disclosed herein, include, but are not limited to: games involving multiple vehicles, where drivers compete with each other or cooperate on a common goal; trivia; puzzles; a spelling bee; math questions; games with leaderboards, progression to harder levels, and/or score-keeping; lottery-like games in which the driver's lottery number is created from certain actions such as numbers of stops, or the drivers' reporting of every blue object seen during the trip; games tailored to dynamically accommodate the travel time; games in which puzzle difficulty is chosen to fit the driver's commute time; games that start and/or end automatically at the beginning/ending of a trip or commute; "points-of-interest" trivia games designed to ask the driver questions about things recently passed, for example, "what was the last fast-food restaurant passed on your left?"; a bingo game in which the driver announces, for example, types of vehicles seen, or highway signs, and in which the driver may look at the final bingo board at the end of the trip; a "scavenger hunt" game in which the driver drives to locations meeting certain criteria, for example, a parking garage on the first floor of a building; "road rally" games, such as one in which the GPS-powered in-vehicle gaming system scores the driver based on adherence to the rules of the road rally; a "safe driving" game in which the driver scores points by exhibiting safe driving behaviors, such as adhering to the speed limit, full stops at stop signs, excessive acceleration/deceleration; a "safe driving" game in which the driver is penalized when committing infractions; games that operate only when the driver is driving safely; games that are suspended or terminated when the driver commits an infraction, such as exceeding the speed limit; games in which the driver must maintain some minimum speed for the game to proceed; games in which the gameplay might only occur when the vehicle is stopped, for example, spell as many words as possible during a red light; games designed to involve multiple vehicles, for example where each driver is a player; games in which the multiple drivers compete against each other, for example in a multiplayer trivia game in which the drivers can hear each other talking and providing input to the game; games in which teams of drivers might compete with each other; a trivia game in which the drivers on a team hear each other discuss the team response before a distinguished team member supplies the answer; road rally games in which each driver "hands off" the route to the next driver, enabled by close proximity of their vehicles; games in which drivers join teams or games based on similar level achieved in the particular game; games in which drivers are matched based on location or other attributes such as, for example; same highway (or highway type), same town, same vehicle (type), same direction being traveled; games involving driving "teams" which accumulate an aggregate score based on safe driving practices, or adherence to road rally rules; a "Dungeons and Dragons"-inspired game, in which each driver and/or passenger can be a player, in which the equivalent of "dice rolls" could be data derived from random objects in the road or on the route (for example, the license plate in front of you, the 1st digit of the speed limit, the address of the next location on the left, and so on); a game in which a driver traverses the same route over and over such as with a daily commute, in which there is a "ghost driver" who accompanies the driver, seen, for example, on the GPS display, or an augmented reality display; games or outcomes based on drivers in proximity with each other or by exhibiting similar attributes, such as the same or similar commute, within 5 miles of each other; a game in which a driver asks to be connected with another where driving/location and other personal attributes match; games that combine play that occurs while driving with play that occurs before or after driving; games in which the driver creates a virtual route during a vehicle trip that is then used as input into a companion game or continuation of that game; games in which points gained in driving mode could add to the player's overall score or could enable access to other games, levels, or websites; games in which there is a "virtual" or alternative world which is "mapped" in some way to the "real" world, such that progress, or places visited in the real world while driving affect or correlate with the player's status in the virtual world; an alternate reality game that a driver traverses as they are traversing the road, and in which they add game elements to what they are doing in the vehicle (augmented reality); games in which passengers and possibly the driver may or may not have a display in the vehicle, or could receive an audio report of what is happening; a game in which the data from the game currently being played is stored remotely, and in which state information that is accumulated or created that gets carried over to another context, for example to continue the same game, or to use in another game in some way (for example, the player may accumulate food and resources as they drive, and use those food and resources in a space game on a separate portable electronic device later); a game in which the player is attempting to evade a fictitious driver; games involving players stuck in the same traffic jam; games with teams of drivers based on, for example, odd numbered highways vs. even, or drivers traveling east vs. west; games in which different passengers have different roles based on where they are sitting; games based on OBD inputs, such as a game to encourage drivers to drive efficiently, or to teach a driver about the vehicle's maintenance schedule or features; games in which the player may optionally contact another person for help in the game, for example, a phone a friend (such as a 30 second phone call), or contact a trivia master; and games involving continuing education such as continuing legal education, or in which the subject matter is educational or based on what the driver is trying to learn.

In the in-vehicle gaming system, the game data may be stored in the user computing device 202 or 403, the content server 206, the vehicle embedded computing device 402, or the content data store 208.

In an embodiment, the vehicle may alternatively be any other type of vehicle such as an automobile, motorcycle, boat, train, or airplane, among others.

In another embodiment, the user of the in-vehicle gaming system may be a driver that may accept an end-user license agreement (EULA). The EULA may include provisions that state, for example, that the driver accepts all liability while using, operating, and/or playing the in-vehicle gaming system while driving. Examples of the liability provisions accepted include liability for damage to property (including the vehicle that is being driven, other vehicles, and/or other property) or person (including injury to, or loss of life of, the driver, other passengers in the vehicle, and/or any others). The EULA may be presented to the user/driver visually, through audio, or in some other way. The EULA may be accepted by the user/driver before entering the vehicle, or after entering the vehicle. The EULA may be accepted by voice, touch, or gesture. For example, the EULA may be accepted by the user/driver by pressing the gas or brake pedal, by pressing the horn of the vehicle, by touching an in-vehicle gaming display (such as a built-in navigation display or a smartphone display), and/or by speaking, among other things.

The in-vehicle gaming system thus allows a driver to participate in an in-vehicle game, while simultaneously reducing distraction to the driver from his primary activity of driving. Gameplay may be dynamically modified, sometimes so subtly that the driver may not consciously notice, to accommodate different levels of distraction on the road and in the environment. The driver using the in-vehicle gaming system may even be notified of the presence of emergency vehicles or traffic, thus resulting in safer driving than would otherwise be achieved. Vehicle passengers may also participate in the in-vehicle game, providing safe entertainment for all the occupants of the vehicle.

Additionally, the in-vehicle gaming system customizes the content of the in-vehicle games being played based on the user information of the participants and the environment in which the game is being played. Thus, the game may be more enjoyable for the users than it would otherwise be. In-vehicle games may even be customized for an entire group of users, making the game more enjoyable for the entire group.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for in-vehicle gaming, the system comprising:
an electronic data store configured to store items of gameplay content, one or more of the items of gameplay content being associated with a user;
a computing device in communication with the electronic data store, the computing device configured to:
identify the user operating a vehicle;
retrieve an item of gameplay content associated with the user from the electronic data store;
cause presentation, to the user operating the vehicle, of the item of gameplay content for game play;
monitor one or more environmental factors to the vehicle as the user operates the vehicle;
determine a distraction index indicative of a distraction level of the user operating the vehicle based at least in part on the monitored one or more environmental factors;
modify the item of gameplay content based at least in part on the determined distraction index as the item of gameplay content is presented to the user for continued game play, the item of gameplay content modified to improve the distraction index; and
receive input from the user in response to the modified item of gameplay content.

2. The system of claim 1, wherein the computing device is embedded in the vehicle.

3. The system of claim 1, wherein the presented item of gameplay content is presented to the user at least one of aurally, visually, or tactilely.

4. The system of claim 1, wherein the input received from the user is at least one of voice, touch, or gesture.

5. The system of claim 1, wherein, in response to the distraction index satisfying a predefined threshold, the modified item of gameplay content is not presented to the user.

6. The system of claim 1, wherein the item of gameplay content is modified to be at least one of more difficult, less difficult, presented aurally, presented visually, presented tactilely, of a different genre, or of a different gameplay type.

7. The system of claim 1, wherein the user accepts a liability agreement before the modified item of gameplay content is presented to the user.

8. The system of claim 1, wherein improving the distraction index is indicative of a reduced distraction of the user.

9. A system for in-vehicle gaming, the system comprising:
an electronic data store configured to store one or more items of gameplay content; and
a computing device in communication with the electronic data store, the computing device configured to:
retrieve an item of gameplay content from the electronic data store;
cause presentation, to a user operating the vehicle, the retrieved item of gameplay content;
monitor one or more environmental factors associated with at least one of the user or the vehicle as the user operates the vehicle and interacts with the presented item of gameplay content; and
in response to determining, based at least in part on the one or more monitored environmental factors, that a distraction index associated with the user satisfies a threshold,
modify the item of gameplay content as it is presented to the user for continued game play,
wherein the item of gameplay content is modified to effect a change in the distraction index with respect to the threshold, the change indicative of an improved distraction level of the user.

10. The system of claim 9, the computing device further configured to:
receive input from the user in response to the presented item of gameplay content.

11. The system of claim 10, wherein the input received from the user is at least one of voice, touch, or gesture.

12. The system of claim 9, wherein the computing device is embedded in the vehicle.

13. The system of claim 9, wherein the retrieved item of gameplay content is presented to the user at least one of aurally, visually, or tactilely.

14. The system of claim 9, wherein, in response to the distraction index satisfying a second threshold, the item of gameplay content is not presented to the user.

15. The system of claim 9, wherein the monitored one or more environmental factors includes a driving history of the user.

16. The system of claim 9, wherein the item of gameplay content is modified to be at least one of more difficult, less difficult, presented aurally, presented visually, presented tactilely, of a different genre, or of a different gameplay type.

17. The system of claim 9, wherein the user accepts a liability agreement before enabling interaction with the item of gameplay content.

18. A computer-implemented method for modifying an in-vehicle game, the computer-implemented method comprising:
under control of one or more computing devices configured with specific computer executable instructions,
causing presentation of an in-vehicle game to a user in a vehicle while the user operates the vehicle;
monitoring one or more environmental factors to the vehicle while the vehicle is in operation and as the in-vehicle game is presented to the user in the vehicle for game play;
generating a distraction index for the user based at least in part on the one or more monitored environmental factors; and
modifying, for continued game play by the user, the presented in-vehicle game based at least in part on the generated distraction index while the vehicle is in operation.

19. The computer-implemented method of claim 18, wherein the monitored one or more environmental factors includes a driving history of the user.

20. The computer-implemented method of claim 18, wherein the user is interacting with the presented in-vehicle game as the user operates the vehicle.

21. The computer-implemented method of claim 18, wherein the in vehicle game is modified to improve a distraction level of the user.

22. A computer-implemented method for modifying items of gameplay content associated with an in-vehicle game, the computer-implemented method comprising:
under control of one or more computing devices configured with specific computer executable instructions,
retrieving an item of gameplay content from an electronic data store, the item of gameplay content associated with the in-vehicle game;
causing presentation, to a user operating a vehicle, of the retrieved item of gameplay content for game play;
monitoring one or more environmental factors related to at least one of the vehicle or the user as the user operates the vehicle and interacts with the presented item of gameplay content;
determining a distraction index indicative of a distraction level of the user operating the vehicle based at least in part on the monitored one or more environmental factors; and
modifying the item of gameplay content presented to the user operating the vehicle based at least in part on the determined distraction index as the item of gameplay content is presented to the user for continued game play.

23. The computer-implemented method of claim 22, wherein the retrieved item of gameplay content is presented to the user at least one of aurally, visually, or tactilely.

24. The computer-implemented method of claim 22 further comprising:
under control of the one or more computing devices configured with specific computer executable instructions,
receiving input from the user in response to the presented item of gameplay content,
wherein the input received from the user is at least one of voice, touch, or gesture.

25. The computer-implemented method of claim 24, wherein, in response to the distraction index satisfying a predefined threshold, the item of gameplay content is not presented to the user.

26. The computer-implemented method of claim 22, wherein the user accepts a liability agreement before the retrieved item of gameplay content is presented to the user.

27. A non-transitory computer-readable medium having a computer-executable module for modifying items of gameplay content associated with an in-vehicle game, the computer-executable module being configured to:
retrieve an item of gameplay content from an electronic data store, the item of gameplay content associated with the in-vehicle game;
cause presentation, to a user operating a vehicle, of the retrieved item of gameplay content for game play;
monitor one or more environmental factors related to at least one of the vehicle or the user as the user operates the vehicle and interacts with the presented item of gameplay content;
determine a distraction index indicative of a distraction level of the user operating the vehicle based at least in part on the monitored one or more environmental factors; and
modify the item of gameplay content presented to the user operating the vehicle based at least in part on the determined distraction index as the item of gameplay content is presented to the user for continued game play.

28. The non-transitory computer-readable medium of claim 27, wherein the retrieved item of gameplay content is presented to the user at least one of aurally, visually, or tactilely.

29. The non-transitory computer-readable medium of claim 27, wherein the computer-executable module is further configured to:
receive input from the user in response to the presented item of gameplay content,
wherein the input received from the user is at least one of voice, touch, or gesture.

30. The non-transitory computer-readable medium of claim 29, wherein in response to the distraction index satisfying a predefined threshold, input from the user is prohibited.

31. The non-transitory computer-readable medium of claim 27, wherein the user accepts a liability agreement before the retrieved item of gameplay content is presented to the user.

* * * * *

UNITED STATES PATENT AND TRADEMARK OFFICE
CERTIFICATE OF CORRECTION

Page 1 of 1

PATENT NO. : 8,758,127 B2
APPLICATION NO. : 13/752128
DATED : June 24, 2014
INVENTOR(S) : Douglas Cho Hwang It is certified that error appears in the above-identified patent and that said Letters Patent is hereby corrected as shown below:

On the Title Page (item 12, and item 72 Inventors) at line 1, Change "Wang," to --Hwang,--.

In the Drawings

Sheet 6 of 8 (Ref. Numeral 602, Fig. 6) at line 1, Change "ENVIROMENTAL" to --ENVIRONMENTAL--.

In the Claims

In column 29 at line 5, In Claim 21, change "in vehicle" to --in-vehicle--.

Signed and Sealed this
Twenty-seventh Day of January, 2015

Michelle K. Lee
*Deputy Director of the United States Patent and Trademark Office*